United States Patent
Peng

(10) Patent No.: US 12,368,604 B2
(45) Date of Patent: Jul. 22, 2025

(54) CERTIFICATE LIST UPDATE METHOD AND APPARATUS

(71) Applicant: SHENZHEN YINWANG INTELLIGENT TECHNOLOGIES CO., LTD., Shenzhen (CN)

(72) Inventor: Jianfen Peng, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 190 days.

(21) Appl. No.: 17/947,710

(22) Filed: Sep. 19, 2022

(65) Prior Publication Data
US 2023/0015877 A1 Jan. 19, 2023

Related U.S. Application Data

(63) Continuation of application No. PCT/CN2020/080261, filed on Mar. 19, 2020.

(51) Int. Cl.
*H04L 9/32* (2006.01)
*H04L 9/08* (2006.01)
*H04W 12/069* (2021.01)

(52) U.S. Cl.
CPC .......... *H04L 9/3268* (2013.01); *H04L 9/0891* (2013.01); *H04W 12/069* (2021.01)

(58) Field of Classification Search
CPC . H04L 9/3268; H04L 9/0891; H04L 2209/84; H04L 9/50; H04L 9/0897; H04L 9/3263; G06F 21/64; H04W 12/069
See application file for complete search history.

(56) References Cited

U.S. PATENT DOCUMENTS

| | | | |
|---|---|---|---|
| 7,734,050 B2 * | 6/2010 | Tengler | H04L 9/3263 380/43 |
| 9,742,569 B2 | 8/2017 | Van Roermund | |
| 10,756,909 B2 * | 8/2020 | Condeixa | H04L 9/3268 |

(Continued)

FOREIGN PATENT DOCUMENTS

| | | |
|---|---|---|
| CN | 102027705 A | 4/2011 |
| CN | 106385315 A | 2/2017 |

(Continued)

OTHER PUBLICATIONS

Khodaei et al., "Efficient, Scalable, and Resilient Vehicle-Centric Certificate Revocation List Distribution in VANETs," WiSec '18: Proceedings of the 11th ACM Conference on Security and Privacy in Wireless and Mobile Networks, Jun. 2018, 12 pages.

(Continued)

*Primary Examiner* — Christopher A Revak
(74) *Attorney, Agent, or Firm* — Fish & Richardson P.C.

(57) ABSTRACT

Obtaining a certificate record, where the certificate record is sent by a network side device to the first vehicle, and the certificate record includes at least one revoked certificate or at least one valid certificate; and updating, based on the certificate record, a certificate list stored in the first vehicle, where the certificate list is used to record a revoked certificate or a valid certificate of a device that belongs to the first vehicle, or used to record a revoked certificate or a valid certificate of a device that belongs to a first vehicle group, where the first vehicle group includes the first vehicle.

23 Claims, 10 Drawing Sheets

(56) References Cited

U.S. PATENT DOCUMENTS

| | | | |
|---|---|---|---|
| 2016/0119151 A1* | 4/2016 | Park | H04W 12/043 |
| | | | 713/158 |
| 2017/0317837 A1 | 11/2017 | Alrawais et al. | |
| 2018/0176209 A1 | 6/2018 | Narayanan et al. | |
| 2019/0173862 A1 | 6/2019 | Kim et al. | |
| 2020/0137580 A1* | 4/2020 | Yang | H04W 12/122 |
| 2020/0280842 A1* | 9/2020 | Liu | H04L 9/3268 |
| 2021/0344513 A1* | 11/2021 | Russell | H04W 4/40 |
| 2023/0198784 A1* | 6/2023 | Miller | H04L 63/0869 |
| | | | 713/151 |
| 2024/0119446 A1* | 4/2024 | Rane | G06Q 20/38215 |

FOREIGN PATENT DOCUMENTS

| | | | | |
|---|---|---|---|---|
| CN | 107425981 A | 12/2017 | | |
| CN | 108923928 A | 11/2018 | | |
| CN | 105246071 B | 5/2019 | | |
| CN | 109936453 A | 6/2019 | | |
| CN | 110858804 A | 3/2020 | | |
| EP | 3324573 A1 * | 5/2018 | | H04L 9/3268 |
| JP | 2017046080 A | 3/2017 | | |
| JP | 2018007215 A | 1/2018 | | |
| JP | 2020013347 A | 1/2020 | | |
| WO | WO-2015092967 A1 * | 6/2015 | | H04L 63/0823 |
| WO | 2018150546 A1 | 8/2018 | | |
| WO | WO-2021158021 A1 * | 8/2021 | | B60L 53/62 |

OTHER PUBLICATIONS

Lei et al., "A blockchain based certificate revocation scheme for vehicular communication systems," Future Generation Computer Systems, Sep. 2020, 12 pages.

Extended European Search Report in European Appln No. 20926256.7, dated Mar. 20, 2023, 8 pages.

Tuladhar et al., "Efficient and Scalable Certificate Revocation List Distribution in Hierarchical VANETs," IEEE, Oct. 21, 2018, 6 pages.

Office Action in Chinese Appln. No. 202080005176.X, dated Sep. 22, 2021, 21 pages (with English translation).

International Search Report and Written Opinion in International Appln. No. PCT/CN2020/080261, mailed on Dec. 14, 2020, 10 pages (with English translation).

Office Action in Japanese Appln. No. 2022-555928, mailed on Dec. 19, 2023, 12 pages (with English translation).

* cited by examiner

CERTIFICATE LIST UPDATE METHOD AND APPARATUS

CROSS-REFERENCE TO RELATED APPLICATIONS

This application is a continuation of International Application No. PCT/CN2020/080261, filed on Mar. 19, 2020, the disclosure of which is hereby incorporated by reference in its entirety.

TECHNICAL FIELD

This application relates to the field of intelligent and connected vehicle technologies, and in particular, to a certificate list update method and apparatus.

BACKGROUND

With development of intelligentization and networking, a network side device (for example, a server) or a vehicle-mounted device may track and learn a vehicle status by using an internet of vehicles technology, and vehicle functions continue to increase, which brings convenience to a life of a user. In an internet of vehicles system, an unauthorized device may send interference data to a vehicle by using the internet of vehicles system, or monitor vehicle information and control the vehicle, thereby interfering with implementation of vehicle functions and threatening vehicle security. To ensure vehicle security, after the vehicle-mounted device is started or before a function of the vehicle (for example, automatic driving) is used, authentication is performed on a related vehicle-mounted device based on a digital certificate, that is, a device certificate of the vehicle-mounted device, to confirm an identity of the related vehicle-mounted device, and ensure validity of the related vehicle-mounted device. Validness of the digital certificate may be ensured by using a private key stored in the vehicle-mounted device. If the digital certificate is invalid due to a reason such as a leak of the private key, a certificate authority (CA) revokes the digital certificate, and places the digital certificate into a digital certificate revocation list (CRL) publicly released by the certificate authority, so that vehicles can learn of the CRL.

In the conventional technology, a consortium blockchain system including supervision nodes (for example, CAs) and operation nodes (for example, vehicle-mounted devices) is usually used to maintain the publicly released CRL. Each operation node stores a same deregistration blockchain, and the deregistration blockchain includes certificate revocation records of all operation nodes. If a large quantity of certificate revocation records are stored in the deregistration blockchain, an operation node may be unable to store all the certificate revocation records, due to limited storage space of the operation node that stores the deregistration blockchain. As a result, some certificate revocation records are lost, and vehicle security is threatened.

SUMMARY

This application provides a certificate list update method and apparatus. A certificate list stored in a first vehicle is updated based on a certificate record sent by a network side device to the first vehicle, to reduce certificate records that need to be stored in the first vehicle, and ensure integrity of the certificate list stored in a vehicle-mounted device of the first vehicle.

To achieve the foregoing objectives, the following technical solutions are used in this application.

According to a first aspect, an embodiment of this application provides a certificate list update method, and relates to the field of communications technologies. The method includes: obtaining a certificate record, where the certificate record is sent by a network side device to a first vehicle, and the certificate record includes at least one revoked certificate or at least one valid certificate; and updating, based on the certificate record, a certificate list stored in the first vehicle, where the certificate list is used to record, for the first vehicle, a revoked certificate or a valid certificate of a device that belongs to the first vehicle, or used to record, for a first vehicle group, a revoked certificate or a valid certificate of a device that belongs to a first vehicle group, where the first vehicle group includes the first vehicle. The certificate list is used to record, for the first vehicle, the revoked certificate or the valid certificate of the device that belongs to the first vehicle, and does not include a revoked certificate or a valid certificate of a device that does not belong to the first vehicle. Alternatively, the certificate list is used to record, for the first vehicle group, the revoked certificate or the valid certificate of the device that belongs to the first vehicle group, and does not include a revoked certificate or a valid certificate of a device that does not belong to the first vehicle group.

According to the foregoing process, in this application, the certificate list stored in the first vehicle may be updated based on the certificate record that includes the at least one revoked certificate or the at least one valid certificate. Because the certificate list records, for the first vehicle or the first vehicle group, the revoked certificate or the valid certificate of the device that belongs to the first vehicle or the first vehicle group, certificate records that need to be stored in a vehicle-mounted device in the first vehicle may be reduced. When storage space of the vehicle-mounted device is limited, integrity of the certificate list stored in the device is ensured as much as possible, thereby ensuring vehicle security.

In a possible implementation, the certificate record is generated by the network side device for the first vehicle or the first vehicle group, and each revoked certificate or each valid certificate in the certificate record is a certificate of the device that belongs to the first vehicle or the first vehicle group.

In a possible implementation, the certificate record is generated by the network side device for the first vehicle or the first vehicle group, and each revoked certificate or each valid certificate in the certificate record is a certificate of the device that belongs to the first vehicle or the first vehicle group. The updating, based on the certificate record, a certificate list stored in the first vehicle includes: adding each revoked certificate or each valid certificate in the certificate record to the certificate list.

According to the foregoing process, the network side device generates the certificate record of the first vehicle or the first vehicle group, and then the first vehicle receives the certificate record sent by the network side device, updates the certificate record, and stores the certificate record in the certificate list of the first vehicle. The certificate list of the first vehicle is used to store the certificate record of the first vehicle or the first vehicle group. Rather than storing certificate records of all vehicles, the certificate list stores less content. Therefore, when the storage space of the vehicle-mounted device is limited, integrity of the certificate record stored in the first vehicle may be ensured as much as possible, thereby ensuring vehicle security.

In a possible implementation, the updating, based on the certificate record, a certificate list stored in the first vehicle includes: determining at least one revoked certificate or at least one valid certificate that is in the certificate record and that is of the device that belongs to the first vehicle or the first vehicle group; and adding the at least one revoked certificate or the at least one valid certificate of the device that belongs to the first vehicle or the first vehicle group to the certificate list.

According to the foregoing process, after obtaining the certificate record, the network side device directly sends the certificate record to the first vehicle, and the first vehicle determines the revoked certificate or the valid certificate that belongs to the first vehicle or the first vehicle group, updates the revoked certificate or the valid certificate that belongs to the first vehicle or the first vehicle group, and stores the revoked certificate or the valid certificate that belongs to the first vehicle or the first vehicle group to the certificate list. Rather than storing certificate records of all vehicles, the certificate list stores less content. Therefore, when the storage space of the vehicle-mounted device is limited, integrity of the certificate record stored in the first vehicle may be ensured as much as possible, thereby ensuring vehicle security.

In a possible implementation, the certificate list further includes a revoked certificate or a valid certificate of a device that belongs to a second vehicle, and the second vehicle is another vehicle other than the first vehicle in the first vehicle group. The revoked certificate or the valid certificate of the device that belongs to the second vehicle is used by the first vehicle to attempt to authenticate the second vehicle.

According to the foregoing process, the certificate list further includes a certificate record of the second vehicle that belongs to a same vehicle group as the first vehicle, so that the first vehicle can attempt to authenticate the second vehicle based on the certificate list, thereby ensuring security of communication between vehicles in the first vehicle group.

In a possible implementation, the updating, based on the certificate record, a certificate list stored in the first vehicle includes: obtaining an identifier of a first certificate list data block, where the first certificate list data block is a data block corresponding to the certificate list before update; and generating an updated certificate list data block based on the identifier of the first certificate list data block and the certificate record, where the updated certificate list data block includes a block header and a block body, the block header of the updated certificate list data block includes the identifier of the first certificate list data block, and the block body of the updated certificate list data block includes the certificate record.

According to the foregoing process, the certificate record in the certificate list is stored in a form of a blockchain, so that security of the certificate record stored in the certificate list can be ensured, thereby improving vehicle security. In addition, the updated certificate list data block includes the block header and the block body, the block header includes the identifier of the first certificate list data block, and the block body includes the certificate record. In other words, the updated certificate list data block only includes a newly added certificate record and the identifier of the first certificate list data block, and does not repeatedly store a previous certificate record. Therefore, a volume of the updated certificate list data block is relatively small. When the storage space of the device in the vehicle is limited, integrity of the certificate record stored in the first vehicle can be ensured as much as possible, thereby ensuring vehicle security.

In a possible implementation, the block header of the updated certificate list data block further includes an identifier of the certificate record.

In a possible implementation, the block body of the updated certificate list data block further includes the first certificate list data block.

In a possible implementation, the identifier of the first certificate list data block is a hash value generated based on the first certificate list data block, and the identifier of the certificate record is a hash value generated based on the certificate record.

In a possible implementation, before the updating, based on the certificate record, a certificate list stored in the first vehicle, the method further includes: attempting to verify the certificate record based on signature information in the certificate record; and if the verification succeeds, updating, based on the certificate record, the certificate list stored in the first vehicle.

In a possible implementation, the revoked certificate includes one or more of a vehicle identifier, a device identifier, or a device type. The valid certificate includes one or more of a vehicle identifier, a device identifier, or a device type. The device type includes a network-connected device and a non-network-connected device. The network-connected device is a vehicle-mounted device that is in a vehicle and that communicates with an external device, for example, a vehicle-mounted device or a network side device in another vehicle. The non-network-connected device is a vehicle-mounted device that is in a vehicle that communicates with an external device by using the network-connected device.

In a possible implementation, the device identifier includes a vehicle identifier.

Compared with the conventional technology in which a database is searched, based on a device identifier of a vehicle-mounted device, for an identifier of a vehicle in which the vehicle-mounted device corresponding to the device identifier is located, in this application, a device identifier of a vehicle-mounted device includes an identifier of a vehicle in which the vehicle-mounted device is located, and binding between the vehicle-mounted device and the vehicle can be implemented. In this way, when delivering the certificate record, the network side device directly determines, based on the identifier of the vehicle-mounted device, the vehicle in which the vehicle-mounted device is located, thereby improving efficiency of delivering the certificate record by the network side device.

According to a second aspect, an embodiment of this application provides a certificate list update method, and relates to the field of communications technologies. The method includes: sending a certificate record to a first vehicle, where the certificate record includes at least one revoked certificate or at least one valid certificate, and the certificate record is used by the first vehicle to update a certificate list stored in the first vehicle. The certificate list is used to record, for the first vehicle, a revoked certificate or a valid certificate of a device that belongs to the first vehicle, and does not include a revoked certificate or a valid certificate of a device that does not belong to the first vehicle. Alternatively, the certificate list is used to record, for a first vehicle group, a revoked certificate or a valid certificate of a device that belongs to the first vehicle group, and does not include a revoked certificate or a valid certificate of a device that does not belong to the first vehicle group. The first vehicle group includes the first vehicle.

In a possible implementation, the at least one revoked certificate or the at least one valid certificate is a certificate of the device that belongs to the first vehicle or the first vehicle group, and before the sending a certificate record to the first vehicle, the method further includes: determining the at least one revoked certificate or the at least one valid certificate of the device that belongs to the first vehicle or the first vehicle group; and generating a certificate record of the first vehicle or the first vehicle group based on the at least one revoked certificate or the at least one valid certificate of the device that belongs to the first vehicle or the first vehicle group.

In a possible implementation, the determining the at least one revoked certificate or the at least one valid certificate of the device that belongs to the first vehicle or the first vehicle group includes: determining, based on device identifiers or vehicle identifiers in revoked certificates or valid certificates, the at least one revoked certificate or the at least one valid certificate of the device that belongs to the first vehicle or the first vehicle group.

In a possible implementation, the determining the at least one revoked certificate or the at least one valid certificate of the device that belongs to the first vehicle or the first vehicle group includes: determining, by querying a vehicle certificate management system, the at least one revoked certificate or the at least one valid certificate of the device that belongs to the first vehicle or the first vehicle group.

In a possible implementation, before the generating a certificate record, the method further includes: determining, by a network side device, that the device corresponding to the at least one revoked certificate does not include a network-connected device, where the network-connected device is a network-connected device of the first vehicle; and the sending, by a network side device, a certificate record to a first vehicle includes: sending the certificate record to the network-connected device in the first vehicle. The network-connected device of the first vehicle is a vehicle-mounted device that is in the first vehicle and that is configured to communicate with an external device, for example, a vehicle-mounted device or a network side device in another vehicle.

In a possible implementation, before the generating a certificate record, the method further includes: determining that the device corresponding to the at least one revoked certificate includes a network-connected device, where the network-connected device is a network-connected device of the first vehicle; notifying a user of the first vehicle to re-register with the network-connected device; and sending the certificate record to the first vehicle after it is determined that the user has re-registered with the network-connected device. The sending the certificate record to the first vehicle includes: sending the certificate record to the network-connected device in the first vehicle.

In a possible implementation, the revoked certificate includes one or more of a vehicle identifier, a device identifier, or a device type. The valid certificate includes one or more of a vehicle identifier, a device identifier, or a device type. The device type includes a network-connected device and a non-network-connected device. The network-connected device is a vehicle-mounted device that is in a vehicle and that communicates with an external device, for example, a vehicle-mounted device or a network side device in another vehicle. The non-network-connected device is a vehicle-mounted device that is in a vehicle that communicates with an external device by using the network-connected device.

In a possible implementation, the device identifier includes a vehicle identifier.

In a possible implementation, the certificate list includes a revoked certificate or a valid certificate of a device that belongs to a second vehicle, and the second vehicle is another vehicle other than the first vehicle in the first vehicle group. The revoked certificate or the valid certificate of the device that belongs to the second vehicle is used by the first vehicle to attempt to authenticate the second vehicle.

According to a third aspect, an embodiment of this application provides a certificate list update apparatus. The apparatus is applied to a first vehicle, and includes an obtaining unit and an update unit. The obtaining unit is configured to obtain a certificate record. The certificate record is sent by a network side device to the first vehicle, and the certificate record includes at least one revoked certificate or at least one valid certificate. The update unit is configured to update, based on the certificate record, a certificate list stored in the first vehicle, where the certificate list is used to record, for the first vehicle, a revoked certificate or a valid certificate of a device that belongs to the first vehicle, and does not include a revoked certificate or a valid certificate of a device that does not belong to the first vehicle. Alternatively, the certificate list is used to record, for a first vehicle group, a revoked certificate or a valid certificate of a device that belongs to the first vehicle group, and does not include a revoked certificate or a valid certificate of a device that does not belong to the first vehicle group. The first vehicle group includes the first vehicle.

In a possible implementation, the certificate record is generated by the network side device for the first vehicle or the first vehicle group, and each revoked certificate or each valid certificate in the certificate record is a certificate of the device that belongs to the first vehicle or the first vehicle group.

In a possible implementation, that the update unit is configured to update, based on the certificate record, the certificate list stored in the first vehicle includes: adding each revoked certificate or each valid certificate in the certificate record to the certificate list.

In a possible implementation, that the update unit is configured to update, based on the certificate record, the certificate list stored in the first vehicle includes: determining at least one revoked certificate or at least one valid certificate that is in the certificate record and that is of the device that belongs to the first vehicle or the first vehicle group; and adding the at least one revoked certificate or the at least one valid certificate of the device that belongs to the first vehicle or the first vehicle group to the certificate list.

In a possible implementation, the certificate list further includes a revoked certificate or a valid certificate of a device that belongs to a second vehicle, and the second vehicle is another vehicle other than the first vehicle in the first vehicle group. The revoked certificate or the valid certificate of the device that belongs to the second vehicle is used by the first vehicle to attempt to authenticate the second vehicle.

In a possible implementation, that the update unit is configured to update, based on the certificate record, the certificate list stored in the first vehicle includes: obtaining an identifier of a first certificate list data block, where the first certificate list data block is a data block corresponding to the certificate list before update; and generating an updated certificate list data block based on the identifier of the first certificate list data block and the certificate record, where the updated certificate list data block includes a block header and a block body, the block header of the updated certificate list data block includes the identifier of the first certificate list data block, and the block body of the updated certificate list data block includes the certificate record.

In a possible implementation, the block header of the updated certificate list data block further includes an identifier of the certificate record.

In a possible implementation, the block body of the updated certificate list data block further includes the first certificate list data block.

In a possible implementation, the identifier of the first certificate list data block is a hash value generated based on the first certificate list data block, and the identifier of the certificate record is a hash value generated based on the certificate record.

In a possible implementation, before the update unit is configured to update the certificate list of the first vehicle or the first vehicle group based on the certificate record, the apparatus further includes: a verification unit, configured to attempt to verify the certificate record based on signature information in the certificate record. The update unit is further configured to: if the verification succeeds, update, based on the certificate record, the certificate list stored in the first vehicle.

In a possible implementation, the revoked certificate includes one or more of a vehicle identifier, a device identifier, or a device type. The valid certificate includes one or more of a vehicle identifier, a device identifier, or a device type.

In a possible implementation, the device identifier includes a vehicle identifier.

According to a fourth aspect, this application provides a certificate update apparatus. The apparatus is applied to a network side device and includes: a sending unit, configured to send a certificate record to a first vehicle. The certificate record includes at least one revoked certificate or at least one valid certificate, and the certificate record is used by the first vehicle to update a certificate list stored in the first vehicle. The certificate list is used to record, for the first vehicle, a revoked certificate or a valid certificate of a device that belongs to the first vehicle, and does not include a revoked certificate or a valid certificate of a device that does not belong to the first vehicle. Alternatively, the certificate list is used to record, for a first vehicle group, a revoked certificate or a valid certificate of a device that belongs to the first vehicle group, and does not include a revoked certificate or a valid certificate of a device that does not belong to the first vehicle group. The first vehicle group includes the first vehicle.

In a possible implementation, the at least one revoked certificate or the at least one valid certificate is a certificate of the device that belongs to the first vehicle or the first vehicle group, and before the sending unit is configured to send the certificate record to the first vehicle, the apparatus further includes: a determining unit, configured to determine the at least one revoked certificate or the at least one valid certificate of the device that belongs to the first vehicle or the first vehicle group; and a generation unit, configured to generate a certificate record of the first vehicle or the first vehicle group based on the at least one revoked certificate or the at least one valid certificate of the device that belongs to the first vehicle or the first vehicle group.

In a possible implementation, that the determining unit is configured to determine the at least one revoked certificate or the at least one valid certificate of the device that belongs to the first vehicle or the first vehicle group includes: determining, based on device identifiers or vehicle identifiers in revoked certificates or valid certificates, the at least one revoked certificate or the at least one valid certificate of the device that belongs to the first vehicle or the first vehicle group.

In a possible implementation, that the determining unit is configured to determine the at least one revoked certificate or the at least one valid certificate of the device that belongs to the first vehicle or the first vehicle group includes: determining, by querying a vehicle certificate management system, the at least one revoked certificate or the at least one valid certificate of the device that belongs to the first vehicle or the first vehicle group.

In a possible implementation, before the generation unit is configured to generate the certificate record of the first vehicle or the first vehicle group based on the revoked certificate or the valid certificate of the device that belongs to the first vehicle or the first vehicle group, the apparatus further includes: the determining unit is configured to determine that the device corresponding to the at least one revoked certificate does not include a network-connected device, where the network-connected device is a network-connected device of the first vehicle. That the sending unit is configured to send the certificate record to the first vehicle includes: sending the certificate record to the network-connected device in the first vehicle. The network-connected device of the first vehicle is a vehicle-mounted device that is in the first vehicle and that is configured to communicate with an external device, for example, a vehicle-mounted device or a network side device in another vehicle.

In a possible implementation, before the generation unit is configured to generate the certificate record based on the revoked certificate or the valid certificate of the device that belongs to the first vehicle or the first vehicle group, the apparatus further includes: the determining unit is configured to determine that the device corresponding to the at least one revoked certificate includes a network-connected device, where the network-connected device is a network-connected device of the first vehicle. A notification unit is configured to notify a user of the first vehicle to re-register with the network-connected device. The determining unit is further configured to determine that the user has re-registered with the network-connected device. That the sending unit is configured to send the certificate record to the first vehicle includes: sending the certificate record to the network-connected device in the first vehicle.

In a possible implementation, the revoked certificate includes one or more of a vehicle identifier, a device identifier, or a device type. The valid certificate includes one or more of a vehicle identifier, a device identifier, or a device type. The device type includes a network-connected device and a non-network-connected device. The network-connected device is a vehicle-mounted device that is in a vehicle and that communicates with an external device, for example, a vehicle-mounted device or a network side device in another vehicle. The non-network-connected device is a vehicle-mounted device that is in a vehicle that communicates with an external device by using the network-connected device.

In a possible implementation, the device identifier includes a vehicle identifier.

In a possible implementation, the certificate list further includes a revoked certificate or a valid certificate of a device that belongs to a second vehicle, and the second vehicle is another vehicle other than the first vehicle in the first vehicle group. The revoked certificate or the valid certificate of the device that belongs to the second vehicle is used by the first vehicle to attempt to authenticate the second vehicle.

According to a fifth aspect, this application further provides a certificate list update apparatus, including a processor and a memory. The memory is configured to store computer program instructions, and the processor is configured to run the computer program instructions, so that the certificate list update apparatus performs the certificate list update method according to the first aspect.

According to a sixth aspect, this application further provides a certificate list update apparatus, including a processor and a memory. The memory is configured to store computer program instructions, and the processor is configured to run the computer program instructions, so that the certificate list update apparatus performs the certificate list update method according to the second aspect.

According to a seventh aspect, this application further provides a computer-readable storage medium, including computer instructions. When the computer instructions are run by a processor, a certificate list update apparatus is enabled to perform the certificate list update method according to the first aspect or the second aspect.

According to an eighth aspect, this application further provides a computer program product. When the computer program product is run on a processor, a certificate list update apparatus is enabled to perform the certificate list update method according to the first aspect or the second aspect.

According to a ninth aspect, this application further provides a certificate list update system. The system includes the certificate list update apparatus according to the third aspect and the certificate list update apparatus according to the fourth aspect.

According to a tenth aspect, this application further provides a certificate list update system. The system includes the certificate list update apparatus according to the fifth aspect and the certificate list update apparatus according to the sixth aspect.

BRIEF DESCRIPTION OF DRAWINGS

To describe technical solutions in embodiments of the present application or in the conventional technology more clearly, the following briefly describes the accompanying drawings for describing the embodiments or the conventional technology.

DESCRIPTION OF EMBODIMENTS

To make the objectives, technical solutions, and advantages of the embodiments of the present application clearer, the following clearly describes the technical solutions of the embodiments of the present application with reference to the accompanying drawings in the embodiments of the present application. It is clearly that the described embodiments are some but not all of the embodiments of the present application. All other embodiments obtained by a person of ordinary skill in the art based on the embodiments of the present application without creative efforts shall fall within the protection scope of the present application.

Figure 1A:
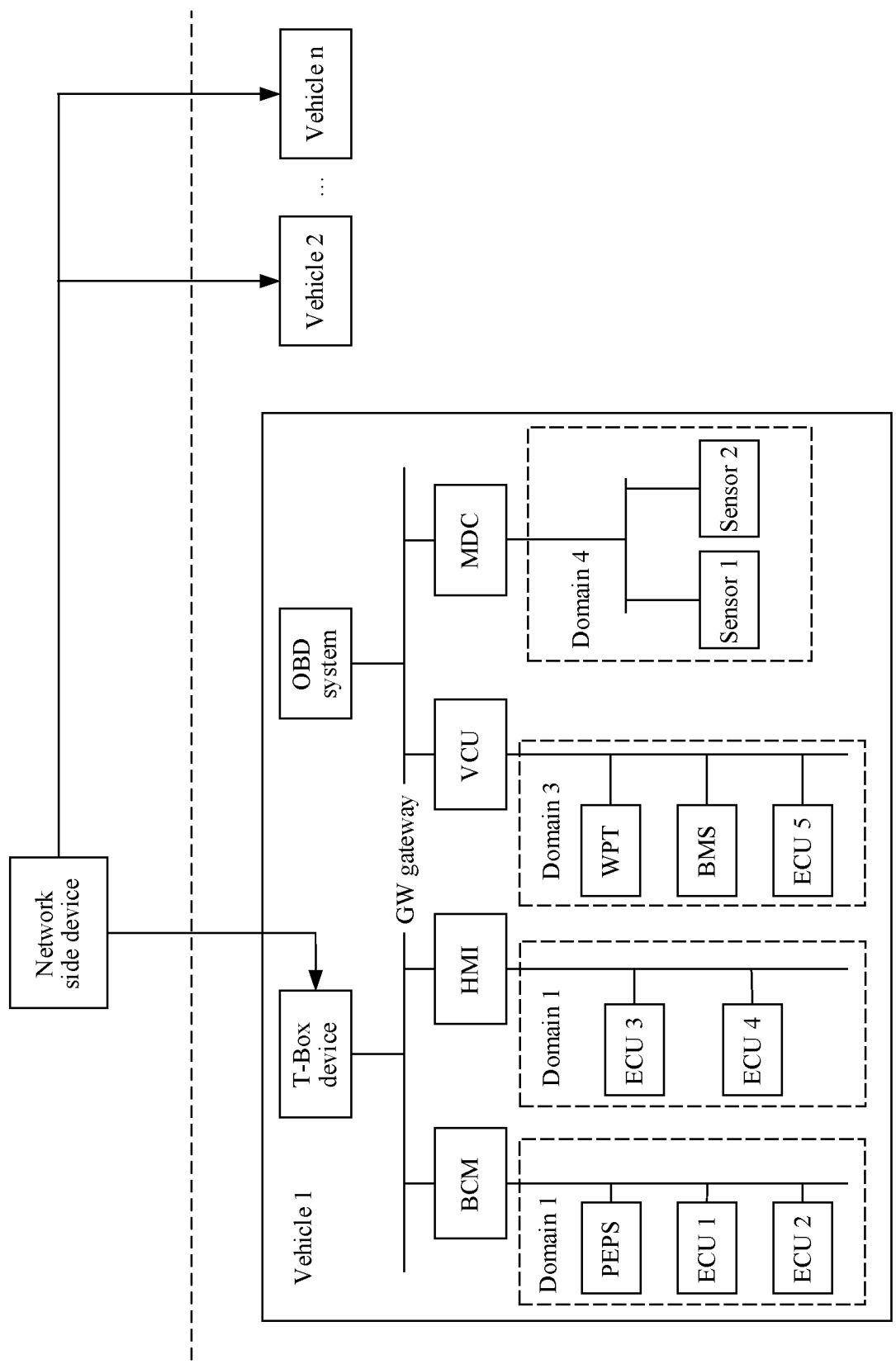
FIG. 1(a) is a schematic diagram of a vehicle digital authentication scenario according to an embodiment of this application.

To resolve a problem in the conventional technology that because storage space of a vehicle-mounted device is limited, if the vehicle-mounted device needs to store a relatively large quantity of certificate records, some certificate records may be lost, thereby threatening vehicle security. This application provides a certificate list update method. The method is applied to a digital authentication scenario of a vehicle, and the digital authentication scenario includes a network side device, a vehicle, and the like, as shown in FIG. 1(a). In the digital authentication scenario, a quantity of vehicles is n (n≥1), and then vehicles may belong to a same vehicle group, or may belong to different vehicle groups. For description of the vehicle group, refer to the following content. Details are not described herein again.

The network side device may be one or more cloud servers (not shown in the figure).

The network side device is configured to obtain at least one revoked certificate after a certificate (the certificate may be a digital certificate) of at least one device in the vehicle is revoked. The at least one revoked certificate may be certificates of devices that belong to a same vehicle, or may be certificates of devices that belong to different vehicles. Subsequently, the network side device generates a related certificate record based on the obtained at least one revoked certificate, and sends the generated certificate record to the vehicle. The network side device is further configured to obtain at least one valid certificate after a certificate of at least one device in the vehicle is updated. The at least one valid certificate may be certificates of devices that belong to a same vehicle, or may be certificates of devices that belong to different vehicles. Subsequently, the network side device generates a related certificate record based on the obtained at least one valid certificate, and sends the generated certificate record to the vehicle. Optionally, the network side device is further configured to: after receiving the revoked certificate or the valid certificate, attempt to verify the revoked certificate or the valid certificate received by the network side device, to ensure security attributes such as authenticity and validity of the revoked certificate or the valid certificate. If the verification succeeds, the network side device is configured to generate a certificate record based on the obtained revoked certificate or the valid certificate, where the certificate record includes signature information written by a CA into the certificate record by using a private key.

The vehicle is configured to receive a certificate record sent by the network side device, and update, based on the certificate record, a certificate list stored in the vehicle. Optionally, the vehicle is further configured to attempt to verify signature information and the like in the certificate record after receiving the certificate record, to ensure security attributes such as authenticity and validity of the certificate record. If the verification succeeds, the vehicle updates, based on the certificate record, the certificate list stored in the vehicle.

The vehicle 1 shown in FIG. 1(*a*) is used as an example. Vehicle-mounted devices in the vehicle include a telematics box (T-Box), a gateway (GW), on-board diagnostics (OBD), a body control module (BCM), a human machine interface (HMI), a vehicle control unit (VCU), and an mobile data center (MDC), a passive entry passive start (PEPS), an electronic control unit (ECU) 1, an ECU 2, an ECU 3, an ECU 4, wireless power transmission (WPT), a battery management system (BMS), an ECU 5, a sensor sensor 1, a sensor sensor 2, and the like.

Optionally, in the embodiments of this application, a device in the vehicle is a vehicle-mounted device, and may be classified into a network-connected device and a non-network-connected device. The network-connected device is a vehicle-mounted device in the vehicle in which the network-connected device is located and configured to communicate with an external device, for example, a network side device or a vehicle-mounted device in another vehicle. The non-network-connected device is a device in the vehicle in which the non-network-connected device is located and configured to communicate with a vehicle-mounted device or a network side device in another vehicle by using the network-connected device. A vehicle 1 shown in FIG. 1(*a*) is used as an example. A device type of a T-Box device in the vehicle 1 is a network-connected device, and device types of vehicle-mounted devices other than the network-connected device (the T-Box device) in the vehicle 1 such as the BCM, the MDC, and the ECU 1 are the non-network-connected device. Optionally, the network-connected device in the vehicle may alternatively be an in-vehicle infotainment (IVI) system, or the like.

The T-Box is the network-connected device, and is configured to communicate with an external device, that is, a vehicle-mounted device or a network side device in another vehicle other than the vehicle in which the T-Box is located. For example, in the embodiments of this application, the T-Box receives, from the network side device, a certificate record of a vehicle-mounted device that belongs to the vehicle (or a vehicle group) in which the T-Box is located. The certificate record includes a revoked certificate or a valid certificate of the vehicle-mounted device that belongs to the vehicle (or the vehicle group) in which the T-Box is located. The T-Box is further configured to attempt to verify the certificate record based on signature information and the like in the received certificate record, to ensure security attributes such as authenticity and validity of the certificate record. The T-Box is further configured to: after the certificate record received by the T-Box is verified by the T-Box, send the certificate record to another vehicle-mounted device, that is, a non-network-connected device, for verification; or discard the certificate record when the certificate record fails to be verified by the T-Box. The T-Box is further configured to: after the certificate record received by the T-Box is verified by the non-network-connected device, update, based on the certificate record, a certificate list stored in the vehicle in which the T-Box is located. The T-Box is further configured to: when the certificate record received by the T-Box cannot be verified by another vehicle-mounted device, discard the certificate record received by the T-Box. The T-Box is further configured to communicate with the non-network-connected device in the vehicle in which the T-Box is located by using a gateway GW or the like in the vehicle. For example, in this application, the T-Box sends an updated certificate list to another vehicle-mounted device in the vehicle in which the T-Box is located by using the GW or the like.

The GW is a non-network-connected device, and is configured to implement communication between another non-network-connected device in a vehicle in which the GW is located and the network-connected device T-Box, or communication between non-network-connected devices. For example, the GW receives a certificate record from the T-Box, and attempts to verify signature information in the received certificate record, to ensure security attributes such as authenticity and validity of the certificate record. If the certificate record received by the GW can be verified by the GW, the GW forwards the received certificate record to a non-network-connected device in the vehicle in which the GW is located, for example, the OBD. If the certificate record received by the GW cannot be verified by the GW, that is, the verification fails, the GW notifies the network-connected device T-Box that the certificate record cannot be verified by the GW, so that the T-Box discards the certificate record.

The OBD is a non-network-connected device, and is used to detect whether a system or a component related to a control system fails, and warn a driver and the like when the failure occurs. The OBD is further configured to communicate with another vehicle-mounted device (including a network-connected device and a non-network-connected device) in the vehicle in which the OBD is located by using the GW, or communicate with the network side device by using the GW and the T-Box. The OBD is further configured to attempt to verify the signature information and the like in the certificate record received from the GW, to ensure security attributes such as authenticity and validity of the certificate record. If the verification succeeds, the OBD notifies the network-connected device T-Box that the certificate record can be verified by the OBD. If the verification fails, the OBD discards the received certificate record, and notifies the T-Box that the certificate record cannot be verified by the OBD. Optionally, the OBD is further configured to receive the updated certificate list generated by the T-Box.

In this embodiment of this application, non-network-connected devices in the vehicle, for example, the BCM, the HMI, the VCU, and the MDC, are domain controllers, and the four domain controllers correspond to a domain 1, a domain 2, a domain 3, and a domain 4. The BCM is an important controller on the vehicle, and is configured to control an electrical appliance of a vehicle body, for example, a rain wiper, an electric window, a door lock, or a lamp. The domain 1 corresponding to the BCM includes devices such as the PEPS, the ECU 1, and the ECU 2. The PEPS is configured to enable a driver to enter a vehicle or start the vehicle in a keyless case. The ECU 1 and the ECU 2 are micro controllers in the vehicle, and are configured to control the vehicle. The domain 2 corresponding to the HMI includes devices such as the ECU 3 and the ECU 4. The HMI is configured to establish a connection between a person and a computer, and is further configured to exchange information to implement information transmission. The ECU 3 and the ECU 4 are micro controllers in the vehicle, and are configured to control the vehicle. The domain 3 corresponding to the VCU includes devices such as the WPT, the BMS, and the ECU 5. The VCU is configured to:

obtain driver control information, vehicle running information, and the like, send a control instruction to another apparatus, and control and drive the vehicle in different working states in combination with a motor, a battery, an engine, and the like. The WPT is a technology for energy transfer by using an electromagnetic field or an electromagnetic wave. The BMS is configured to establish a connection between a battery and a user, to improve battery utilization, and reduce overcharge and overdischarge of the battery, and the like. The ECU 5 and the like are micro controllers in the vehicle, and are configured to control the vehicle. The domain 4 corresponding to the MDC includes the sensor 1, the sensor 2, and the like. The MDC is configured to: collect data obtained by sensors such as the sensor 1 and the sensor 2, where the data is data used for automatic driving, and send the data to another device by using the GW. In addition to the OBD, other vehicle-mounted devices in the vehicle, for example, a domain controller and an intra-domain device, are further configured to receive the certificate record sent by the network-connected device, and attempt to verify signature information in the certificate record, to ensure security attributes such as authenticity and validity of the certificate record. The other vehicle-mounted devices in the vehicle, for example, the domain controller and the intra-domain device, are further configured to send a verification result to the network-connected device T-Box, so that the T-Box discards the certificate record based on the verification result for the certificate record, or updates, based on to the verification result for the certificate record and the certificate record, the certificate list stored in the vehicle in which the network device is located.

The domain controller is further configured to attempt to verify a device certificate (digital certificate) of the intra-domain device in a domain to which the domain controller belongs, to ensure security attributes such as authenticity, validity, and validness of the device certificate. If the verification succeeds, the intra-domain device can communicate with another device by using the domain controller and the GW. Devices in different domains communicate with each other by using a domain controller of a domain to which the devices belong. Devices in a same domain can directly communicate with each other. Optionally, if devices in different domains are directly connected, for example, the devices in different domains are directly connected by using Bluetooth or the like, the devices in different domains may directly communicate with each other. That is, the T-Box, the OBD, the BCM, the HMI, the VCU, and the MDC in the vehicle 1 communicate with each other by using the GW, or the T-Box, the OBD, the BCM, the HMI, the VCU, and the MDC may alternatively directly communicate with each other. The domain controller and the intra-domain device are non-network-connected devices.

For example, if the ECU 5 in the domain 3 needs to communicate with the ECU 2 in the domain 1, and the ECU 5 is not directly connected to the ECU 2, the ECU 2 and the ECU 5 communicate with each other by using the BCM, the VCU, and the GW. If the ECU 5 in the domain 3 needs to communicate with the ECU 2 in the domain 1, and the ECU 5 is directly connected to the ECU 2 by using Bluetooth, the ECU 2 and the ECU 5 may communicate with each other by using the BCM, the VCU, and the GW, or may directly communicate with each other by using Bluetooth.

Optionally, after intra-domain devices, that is, devices in the domains 1 to 4, are enabled, the domain controller is further configured to attempt to verify identities of the enabled intra-domain devices, that is, attempt to verify device certificates of the intra-domain devices, to ensure security attributes such as authenticity, validity, and validness of the device certificates. If the verification on the device certificates succeeds, that is, it is determined that the identities of the devices in the domains are valid, and the enabled intra-domain devices can run normally. Alternatively, before a function of the vehicle is used, a domain controller and an intra-domain device related to the function are determined, and then the network-connected device attempts to verify device certificates of the devices related to the function, to determine validity of identities of these devices. If the verification on the device certificates of the devices related to this function succeeds, it can be determined that the identities of the devices are valid and the devices can be used normally. If the verification fails, the devices that cannot be verified are disabled or the function is disabled.

In a possible implementation, a valid certificate of a device is a device certificate that can ensure validity of an identity of the device, and the device certificate may be a digital certificate. Usually, the device certificate of the device is valid in a specific time period, and the specific time period is a validity period of the device certificate of the device. When verification is performed on an identity of a device, a device identifier of the device is determined. If a device identifier in a device certificate of the device is the same as the device identifier, and the device certificate does not expire or the device certificate is not revoked, the device certificate can be verified. In other words, validity of the device corresponding to the device certificate is verified. If a device identifier in a device certificate of the device is different from the device identifier, or the device certificate expires, or the device certificate is a revoked certificate, the device certificate cannot be verified. In other words, an identity of the device corresponding to the device certificate is invalid.

In a possible implementation, validity of a device certificate of a device is further ensured by using a private key stored in a device corresponding to a digital certificate and a validity period of the digital certificate. The network side device uses the private key to sign the device certificate (that is, encrypt a public key and a device identifier to obtain encrypted information). In this case, the network-connected device and the vehicle-mounted device of the vehicle may attempt to verify signature information of the device certificate by using the private key stored in the network-connected device and the vehicle-mounted device (that is, decrypt the encrypted information by using the private key to obtain the public key and the device identifier). If the verification succeeds (that is, the obtained public key and the device identifier are the same as the encrypted information), the device certificate does not expire, and the device certificate is not revoked, the device certificate is verified, and the device corresponding to the device certificate is valid.

For example, to enable an automatic driving function, the VCU needs to attempt to verify a device certificate of the MDC to determine validity of an identity of the MDC. The HMI and the MDC need to attempt to verify each other's device certificates to determine validity of identities of the HMI and the MDC. After the verification succeeds, the identities of the VCU, the HMI, and the MDC are valid, and the automatic driving function can be normally enabled. Optionally, automatic driving functions related to the VCU, the HMI, and the MDC may be normally used.

According to the foregoing process, first, in this embodiment of this application, validity of a device identity may be ensured by using a digital certificate of the device. Before the device is used, verification is performed on the digital certificate corresponding to the device, to prevent an unauthorized device from monitoring the vehicle or sending instructions to interfere with the vehicle, thereby ensuring vehicle security. Second, in this embodiment of this application, verification is performed on the certificate record that includes the revoked certificate or the valid certificate, to ensure authenticity, validity, and the like of the certificate record, thereby ensuring vehicle security. Third, the certificate record in this embodiment of this application is generated by the network side device based on the revoked certificate or the valid certificate received by the network side device. Therefore, when the certificate list is updated, only a newly added certificate record is updated. When storage space of the vehicle-mounted device is limited, certificate records related to the vehicle may be stored as much as possible, to reduce loss of the certificate record, thereby ensuring vehicle security.

Figure 1B:
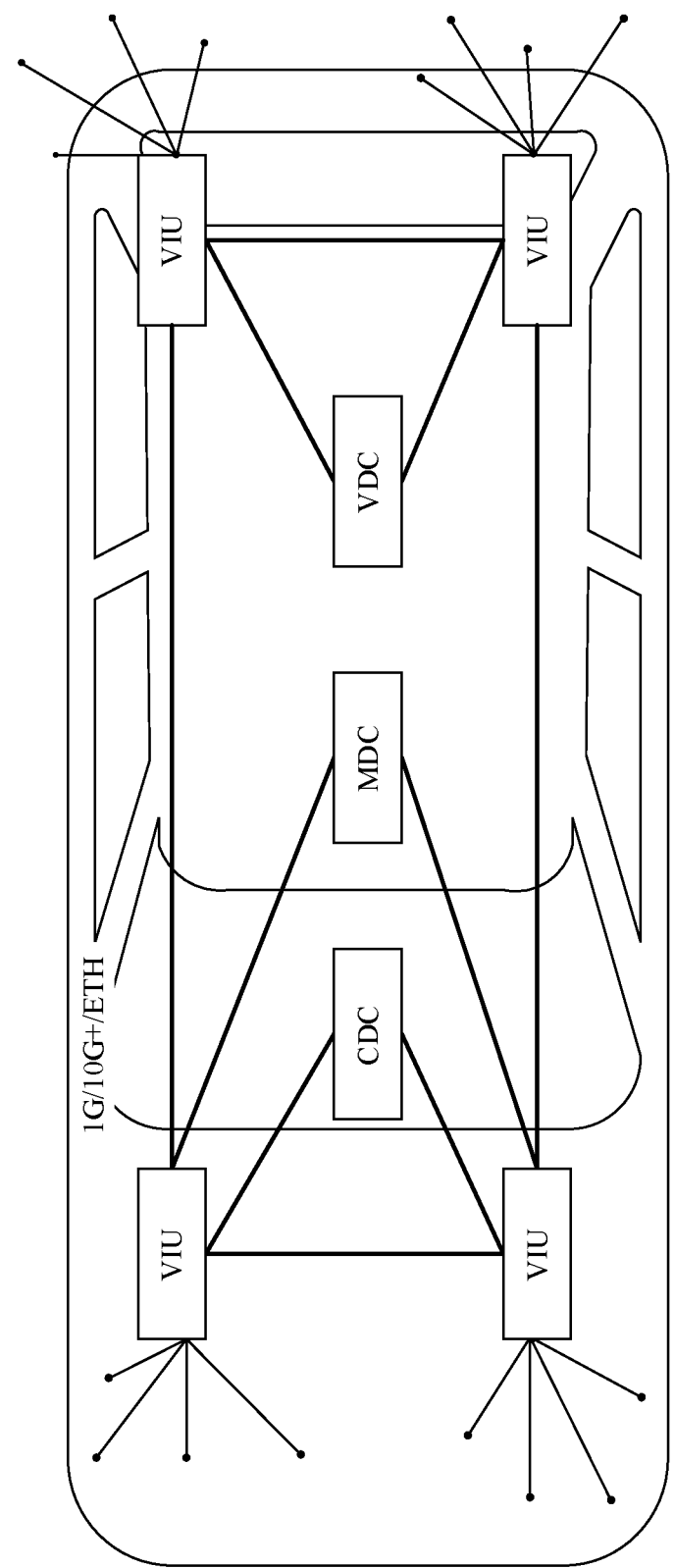
FIG. 1(b) is a schematic diagram of another vehicle digital authentication scenario according to an embodiment of this application.

In addition to the application scenario shown in FIG. 1(a), this embodiment of the present application may be further applied to device authentication in a vehicle based on a central computing architecture (CCA). Refer to FIG. 1(b). The central computing architecture includes a plurality of vehicle integrated/integration units (VIU) and a plurality of automobile components. The plurality of VIUs form a ring network, to implement high bandwidth, low latency, and high reliable processing capabilities. This simplifies vehicle-mounted network configuration and improves upgrade and maintenance efficiency. The plurality of automobile components may be connected to a VIU, and connected to a domain controller (DC) by using the VIU, for example, a cockpit domain controller (CDC), a mobile data center (MDC) (or referred to as an intelligent computing center), or a vehicle domain controller (VDC). This avoids that in a conventional system for implementing an electronic control function of an automobile, each automobile component needs to be connected to the domain controller DC through a respective harness, thereby helping to reduce a harness length in the system for implementing the automobile electronic control function.

For a specific working process of the foregoing network side device and the vehicle, refer to a corresponding process in the following method embodiments. Details are not described herein again.

Before the method embodiments in this application are described in detail, a vehicle group in this application is first described as follows:

In a possible implementation, the vehicle group may be classified based on a brand of a vehicle, or may be classified based on a model of a vehicle, or may be classified based on a location of a vehicle. Certainly, the vehicle group may alternatively be classified according to another condition, for example, a vehicle color, and the like, which is not limited to the foregoing classification manner.

For example, 20 vehicles parked in a parking lot at a moment are used as an example. The parking lot includes an area A and an area B. There are 15 vehicles in the area A, and there are 5 vehicles in the area B. In the 15 vehicles in the area A, 5 vehicles belong to a brand a, and 10 vehicles belong to a brand b. In the 5 vehicles in the area B, 3 vehicles belong to a brand c, and 2 vehicles belong to the brand b. In the vehicles that belong to the brand a, 2 vehicles belong to a series d, and 3 vehicles belong to a series e. In the vehicles that belong to the brand b, 8 vehicles belong to a series f, and 6 vehicles belong to a series g. In the vehicles that belong to the brand c, 2 vehicles belong to a series h, and 1 vehicle belongs to a series i. If the 20 vehicles are classified into vehicle groups based on the areas A and B in which the vehicles are located, two vehicle groups may be obtained: a vehicle group 1 and a vehicle group 2. 15 vehicles in the area A belong to the vehicle group 1, and 5 vehicles in the area B belong to the vehicle group 2. If the 20 vehicles in the parking lot are classified into vehicle groups based on vehicle brands, three vehicle groups may be obtained: a vehicle group 1, a vehicle group 2, and a vehicle group 3. The vehicles of the brand a belong to the vehicle group 3, the vehicles of the brand b belong to a vehicle group 4, and the vehicles of the brand c belong to a vehicle group 5. If vehicle groups are classified based on vehicle models, six vehicle groups may be obtained: a vehicle group 1, a vehicle group 2, a vehicle group 3, a vehicle group 4, a vehicle group 5, and a vehicle group 6. The vehicle of the series d belong to the vehicle group 1, the vehicles of the series e belong to the vehicle group 2, the vehicles of the series f belong to the vehicle group 3, the vehicles of the series g belong to the vehicle group 4, the vehicles of the series h belong to the vehicle group 5, and the vehicle of the series i belongs to the vehicle group 6.

Figure 2:
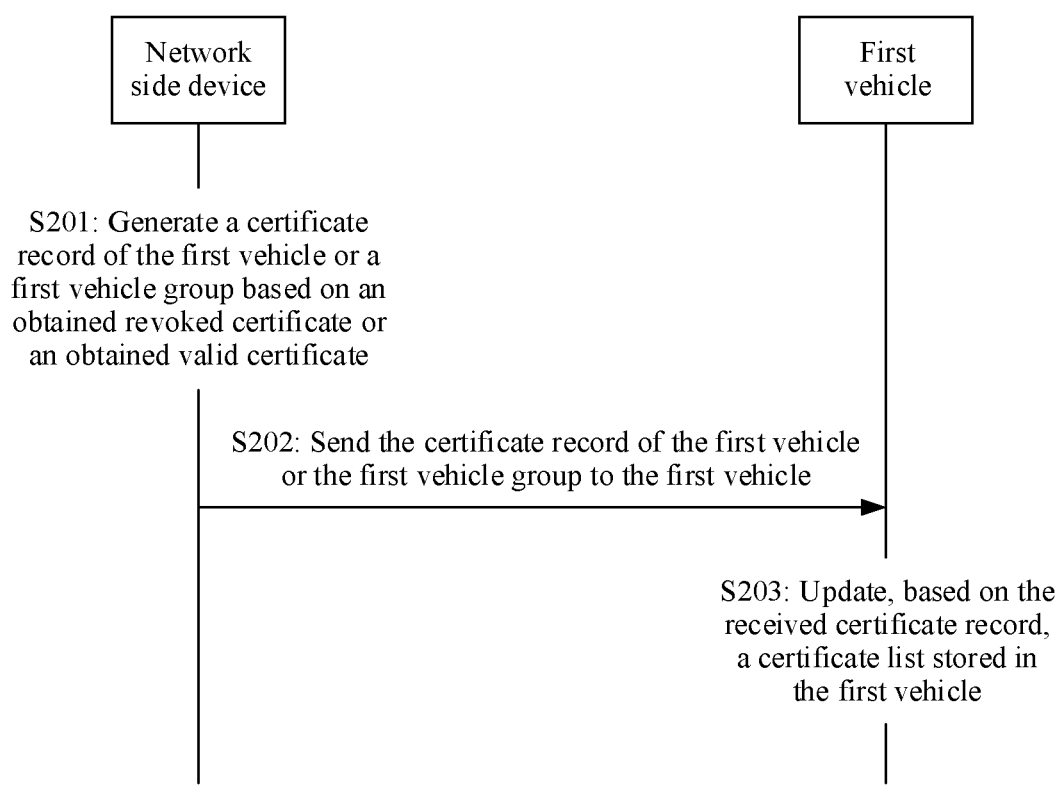
FIG. 2 is a flowchart of a certificate list update method according to an embodiment of this application.

To reduce certificate records that need to be stored in a first vehicle or a first vehicle group, and ensure integrity of a vehicle-mounted certificate list stored in a vehicle-mounted device, this application provides a certificate list update method. After obtaining a revoked certificate or a valid certificate, a network side device generates certificate records of the first vehicle or the first vehicle group based on the obtained revoked certificate or the obtained valid certificate. Then, the network side device sends the certificate records to the first vehicle. Correspondingly, the first vehicle obtains the certificate records that are of the first vehicle or the first vehicle group and that are sent by the network side device. Finally, the first vehicle updates, based on the received certificate records, the certificate list stored in the first vehicle. As shown in FIG. 2, the certificate list update method mainly includes the following steps S201 to S203.

S201: A network side device generates a certificate record of a first vehicle or a first vehicle group based on an obtained revoked certificate or an obtained valid certificate.

The first vehicle group is any vehicle group in a plurality of vehicle groups, and the first vehicle is any vehicle in the first vehicle group. The certificate record generated by the network side device is used by the first vehicle to update a certificate list stored in the first vehicle. There may be one or more certificate records, and the certificate record is generated by the network side device for the first vehicle or the first vehicle group. Each revoked certificate or each valid certificate in the certificate record is a certificate of a device that belongs to the first vehicle or the first vehicle group. The certificate list of the first vehicle is used to record, for the first vehicle, a revoked certificate or a valid certificate of the device that belongs to the first vehicle, and does not include a revoked certificate or a valid certificate of a device that does not belong to the first vehicle. Alternatively, the certificate list of the first vehicle is used to record, for the first vehicle group, a revoked certificate or a valid certificate of the device that belongs to the first vehicle group, and does not include a revoked certificate or a valid certificate that does not belong to the first vehicle group.

Optionally, after a certificate of at least one device is revoked, the network side device obtains at least one revoked certificate. After the at least one device performs registration, the network side device obtains at least one valid certificate. After obtaining the revoked certificate or the valid certificate, the network side device generates the certificate record of the first vehicle or the first vehicle group based on a vehicle in which a device corresponding to the revoked certificate or the valid certificate is located. The certificate record includes at least one revoked certificate or at least one valid certificate.

In a possible implementation, the network side device obtains a number of the revoked certificate or the valid certificate, and queries a vehicle certificate management system based on the number, to obtain the revoked certificate or the valid certificate corresponding to the number. The vehicle certificate management system may be located on the network side device, or may be located on another device. The vehicle certificate management system is configured to manage device certificates of a vehicle, including a revoked certificate of a device that belongs to the vehicle and a valid certificate of a device that belongs to the vehicle. After a validity period of a valid certificate of a device ends, the vehicle certificate management system may determine the valid certificate as an invalid certificate, that is, a revoked certificate. Alternatively, the vehicle certificate management system may determine, according to instructions received by the vehicle certificate management system, a valid certificate of a device as a revoked certificate. The vehicle certificate management system stores the number of the revoked certificate and the number of the valid certificate, and further stores a certificate corresponding to the number of the revoked certificate or the number of the valid certificate, an identifier of a vehicle in which a vehicle-mounted device corresponding to the revoked certificate or the valid certificate is located, an identifier of the vehicle-mounted device, an identifier of a vehicle in a vehicle group in which the vehicle is located, a device identifier of a network-connected device of a vehicle corresponding to each vehicle identifier, and the like.

It should be noted that the certificate record generated by the network side device for the first vehicle or the first vehicle group is generated based on a newly added revoked certificate or a newly added valid certificate. Therefore, a quantity of certificate records is relatively small. Compared with sending both an existing certificate record and a newly added certificate record to a device of the first vehicle for storage, sending only the newly added certificate record to the vehicle-mounted device of the first vehicle for storage can reduce space for storing a currently received certificate list as much as possible when storage space of the vehicle-mounted device is limited, thereby reducing loss of the certificate record stored in the vehicle-mounted device, ensuring integrity of a certificate list stored in the vehicle-mounted device, and ensuring vehicle security.

S202: The network side device sends the certificate record of the first vehicle or the first vehicle group to the first vehicle.

The network side device sends, based on a vehicle identifier of the first vehicle, the certificate record generated by the network side device for the first vehicle or the first vehicle group to a network-connected device of the first vehicle. Correspondingly, the network-connected device of the first vehicle receives the certificate record that is of the first vehicle or the first vehicle group and that is sent by the network side device.

In a possible implementation, if the certificate record generated by the network side device is the certificate record of the first vehicle, the certificate record includes the revoked certificate or the valid certificate of the device that belongs to the first vehicle. If the certificate record generated by the network side device is the certificate record of the first vehicle group, the certificate record includes the revoked certificate or the valid certificate of the device that belongs to the first vehicle group.

It should be noted that, according to the foregoing process, in this application, the certificate record of the first vehicle or the first vehicle group is delivered to the network-connected device of the first vehicle. Compared with storage space for the first vehicle to store certificate records of all vehicles sended by the network side device, storage space for the first vehicle to store the certificate record of the first vehicle or the first vehicle group is relatively small. Therefore, when storage space of the vehicle-mounted device is relatively small, in this embodiment of this application, loss of the certificate record stored in the vehicle-mounted device of the first vehicle can be reduced, thereby ensuring integrity of the certificate record stored in the first vehicle, and improving vehicle security.

S203: The first vehicle updates, based on the certificate record received by the first vehicle, the certificate list stored in the first vehicle.

The network-connected device of the first vehicle adds each revoked certificate or each valid certificate in the certificate record received by the network-connected device of the first vehicle to the certificate list of the first vehicle, and sends the certificate list to a non-network-connected device of the first vehicle, to update the certificate list of the first vehicle. The certificate list includes a previously revoked certificate record or a valid certificate, and a newly added revoked certificate or a newly added valid certificate.

In another possible implementation, a new certificate list is generated based on each revoked certificate or each valid certificate in the certificate record received by the network-connected device of the first vehicle, and the new certificate list is sent to the non-network-connected device in the first vehicle. The new certificate list includes only a newly added revoked certificate or a newly added valid certificate.

It should be noted that, according to the foregoing process, the network side device generates the certificate record of the first vehicle or the first vehicle group based on the revoked certificate or the valid certificate obtained by the network side device and a vehicle in which a device corresponding to the revoked certificate or the valid certificate is located, and sends the certificate record to the first vehicle, and then the first vehicle updates, based on the received certificate record, the certificate list stored in the first vehicle. The certificate record generated by the network side device is a certificate record of the newly added revoked certificate or the newly added valid certificate, where the certificate record is for the first vehicle or the first vehicle group. The first vehicle receives a relatively small quantity of certificate records that will to be stored, and storage space for storing the certificate list obtained based on the certificate record is relatively small. Therefore, when storage space of the vehicle-mounted device is limited, in this embodiment of this application, loss of certificate records that need to be stored in the vehicle-mounted device in the vehicle can be reduced, thereby ensuring integrity of the certificate list stored in the vehicle-mounted device in the vehicle as much as possible, and ensuring vehicle security.

Figure 3:
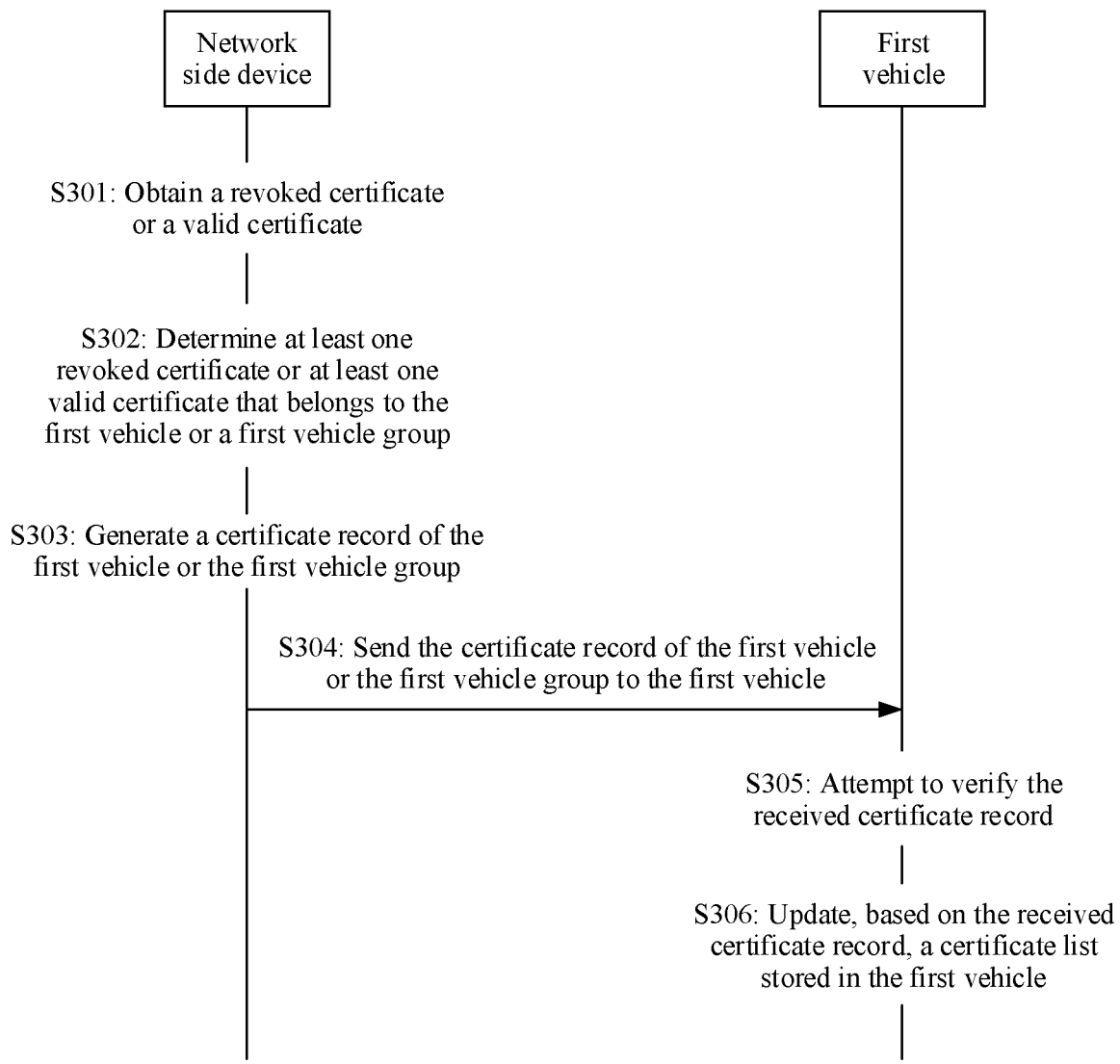
FIG. 3 is a flowchart of a certificate list update method according to an embodiment of this application.

To reduce certificate records that need to be stored in a vehicle-mounted device in a first vehicle, and ensure integrity of a certificate list stored in the vehicle-mounted device, this application further provides a certificate list update method. As shown in FIG. 3, the method includes steps S301 to S306.

S301: A network side device obtains a revoked certificate or a valid certificate.

For descriptions of the revoked certificate or the valid certificate, refer to the following content. Details are not described herein again.

Optionally, after a certificate of at least one vehicle-mounted device is revoked, the network side device obtains at least one revoked certificate. After the at least one vehicle-mounted device performs registration or update, the network side device obtains at least one valid certificate.

Optionally, after obtaining the revoked certificate or the valid certificate, the network side device determines whether a vehicle-mounted device corresponding to the revoked certificate obtained by the network side device includes a network-connected device. If the device corresponding to the revoked certificate obtained by the network side device includes the network-connected device, the network side device notifies a user of the first vehicle to re-register with the network-connected device. After the user has re-registered with the network-connected device, the network side device obtains a valid certificate of the network-connected device. In this case, the network side device generates the certificate record based on the revoked certificate or the valid certificate received before the re-registration of the network-connected device is completed, and the valid certificate that is of the network-connected device and that is obtained after the re-registration of the network-connected device. If the vehicle-mounted device corresponding to the revoked certificate obtained by the network side device does not include the network-connected device, the network side device generates the certificate record based on the revoked certificate or the valid certificate obtained by the network side device.

Figure 4:
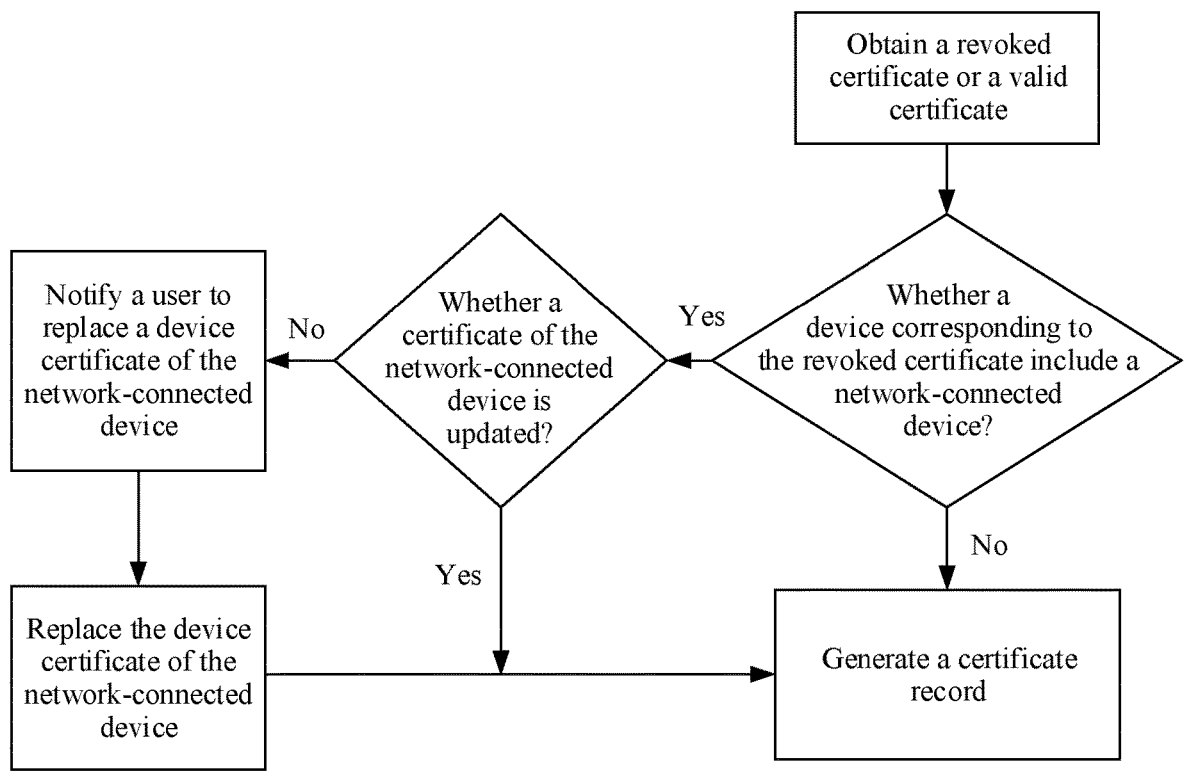
FIG. 4 is a flowchart of obtaining a revoked certificate or valid certificate by a network side device according to an embodiment of this application.

In a possible implementation, as shown in FIG. 4, after obtaining the revoked certificate or the valid certificate, the network side device determines whether the vehicle-mounted device corresponding to the revoked certificate obtained by the network side device includes the network-connected device. If the vehicle-mounted device corresponding to the revoked certificate obtained by the network side device includes the network-connected device, the network side device determines whether the network side device receives a valid certificate of the network-connected device, that is, whether a device certificate of the network-connected device is updated. If the vehicle-mounted device corresponding to the revoked certificate obtained by the network side device includes the network-connected device, and the network side device further obtains the valid certificate of the network-connected device, that is, the device certificate of the network-connected device is updated, the network side device no longer notifies the user to re-register with the network-connected device, and generates the certificate record based on the revoked certificate and the valid certificate received by the network side device. If the device corresponding to the revoked certificate obtained by the network side device includes the network-connected device, and the network side device does not obtain the valid certificate of the network-connected device, that is, the device certificate of the network-connected device is not updated, the network side device notifies the user to re-register with the network-connected device, and obtains the valid certificate of the network device. Subsequently, the network side device generates the certificate record based on the revoked certificate and the valid certificate obtained by the network side device. If the vehicle-mounted device corresponding to the revoked certificate obtained by the network side device does not include the network-connected device, that is, only includes a non-network-connected device, the network side device generates the certificate record based on the revoked certificate or the valid certificate obtained by the network side device.

In a possible implementation, the network side device obtains a number of the revoked certificate or the valid certificate, and queries a vehicle certificate management system based on the number, to obtain the revoked certificate or the valid certificate corresponding to the number. The vehicle certificate management system may be located on the network side device, or may be located on another device. The vehicle certificate management system is configured to manage device certificates of a vehicle, including a revoked certificate of a device that belongs to the vehicle and a valid certificate of a device that belongs to the vehicle. After a validity period of a valid certificate of a device ends, the vehicle certificate management system may determine the valid certificate as an invalid certificate, that is, a revoked certificate. Alternatively, the vehicle certificate management system may determine, according to instructions received by the vehicle certificate management system, a valid certificate of a device as a revoked certificate. The vehicle certificate management system stores the number of the revoked certificate and the number of the valid certificate, and further stores an identifier of a vehicle in which a device corresponding to the revoked certificate or the valid certificate is located, an identifier of the device, an identifier of a vehicle in a vehicle group in which the vehicle is located, a device identifier of a network-connected device of a vehicle corresponding to each vehicle identifier, and the like.

S302: The network side device determines at least one revoked certificate or at least one valid certificate that belongs to the first vehicle or a first vehicle group.

Optionally, after obtaining the revoked certificate or the valid certificate in step S301, the network side device determines, based on device identifiers or vehicle identifiers in the revoked certificate or the valid certificate (device identifier of the network-connected device or device identifier of the non-network-connected device), the at least one revoked certificate or the at least one valid certificate of a device that belongs to the first vehicle or the first vehicle group.

In another possible implementation, after obtaining the revoked certificate or the valid certificate in step S301, the network side device determines, by querying the vehicle certificate management system, the at least one revoked certificate or the at least one valid certificate that is in certificates obtained by the network side device and that is of a device that belongs to the first vehicle or the first vehicle group.

In another possible implementation, the network side device obtains a number of the revoked certificate or the valid certificate, and the user queries the vehicle certificate management system based on the number, to determine the revoked certificate or the valid certificate corresponding to the number, a vehicle in which the device corresponding to the revoked certificate or the valid certificate is located, a vehicle group in which the vehicle is located, and the like. Then, the network side device determines, based on the revoked certificate or the valid certificate found in the vehicle certificate management system and the vehicle or the vehicle group in which the device corresponding to the revoked certificate or the valid certificate is located, the at least one revoked certificate or the at least one valid certificate of the device that belongs to the first vehicle or the first vehicle group.

S303: The network side device generates the certificate record of the first vehicle or the first vehicle group based on the at least one revoked certificate or the at least one valid certificate that belongs to the first vehicle or the first vehicle group.

Optionally, the network side device generates the certificate record of the first vehicle or the first vehicle group based on the at least one revoked certificate or the at least one valid certificate of the device that belongs to the first vehicle or the first vehicle group.

In another possible implementation, the network side device obtains a number of the revoked certificate or the valid certificate, and the user queries the vehicle certificate management system based on the number, to determine a revoked certificate or a valid certificate corresponding to the number, and determine an identifier of a vehicle in which a device corresponding to the revoked certificate or the valid certificate is located, an identifier of a vehicle group in which the vehicle is located, and identifiers of all vehicles in the vehicle group. Subsequently, the network side device generates the certificate record of the first vehicle or the first vehicle group based on information obtained by the network side device from the vehicle certificate management system. The certificate record of the first vehicle includes a number of a revoked certificate or a valid certificate of a device that belongs to the first vehicle, a vehicle identifier of the first vehicle, a device identifier of a network-connected device of the first vehicle, and a device identifier of the device corresponding to the revoked certificate or the valid certificate. The certificate record of the first vehicle group includes a number of a revoked certificate or a valid certificate of a device that belongs to the first vehicle group, identifiers of all vehicles in the first vehicle group, device identifiers of network-connected devices in all vehicles in the first vehicle group, and a device identifier of the device corresponding to the revoked certificate or the valid certificate.

In a possible implementation, the CA performs steps S301 to S303. The CA and the vehicle certificate management system may be located on a same server of the network side device, or may be located on different servers of the network side device.

S304: The network side device sends the certificate record of the first vehicle or the first vehicle group to the first vehicle.

The network side device sends the certificate record of the first vehicle or the first vehicle group to the network-connected device of the first vehicle based on the vehicle identifier of the first vehicle. Correspondingly, the network-connected device of the first vehicle receives the certificate record that is of the first vehicle or the first vehicle group and that is sent by the network side device.

In another possible implementation, the network side device sends the certificate record of the first vehicle or the first vehicle group to all the vehicles in the first vehicle group based on the identifiers of all the vehicles in the first vehicle group. The first vehicle is located in the first vehicle group.

S305: The first vehicle attempts to verify the certificate record received by the first vehicle.

Optionally, after generating the certificate record, the network side device writes signature information into the certificate record by using a private key. After receiving the certificate record of the first vehicle or the first vehicle group, the network-connected device of the first vehicle attempts to verify, based on a private key stored in the network-connected device of the first vehicle, the signature information in the certificate record received by the network-connected device. If the verification succeeds, for example, information obtained by the network-connected device of the first vehicle by decrypting the signature information in the certificate record by using the private key stored in the network-connected device is the same as the information written into the certificate record by the network side device, the network-connected device of the first vehicle updates, based on the certificate record received by the network-connected device of the first vehicle, the certificate list stored in the first vehicle. If the verification fails, the network-connected device of the first vehicle determines that the certificate record received by the network-connected device of the first vehicle is invalid or incorrect, and discards the certificate record.

For example, composition of the vehicle 1 shown in FIG. 1(a) is used as an example. The T-Box attempts to verify the signature information in the certificate record received by the T-Box. If the verification succeeds, the T-Box updates the certificate list stored in the first vehicle based on the certificate record received by the T-Box. If the verification fails, the T-Box discards the received certificate record.

Optionally, the network-connected device of the first vehicle attempts to verify the certificate record received by the first vehicle, and if the verification succeeds, the network-connected device delivers the certificate record to a vehicle-mounted device for verification. If the certificate record can be verified by a preset quantity of vehicle-mounted devices, the network-connected device of the first vehicle updates, based on the certificate record received by the network-connected device of the first vehicle, the certificate list stored in the first vehicle. If the certificate record cannot be verified by the network-connected device, or cannot be verified by at least a preset quantity of vehicle-mounted devices, the network-connected device determines that the certificate record received by the network-connected device is invalid or incorrect, and discards the certificate record.

For example, in the composition of the vehicle 1 shown in FIG. 1(a), the preset quantity is 4. The T-Box is a network-connected device, and another vehicle-mounted device in the vehicle is a non-network-connected device. The T-Box attempts to verify signature information in a certificate record received by the T-Box, and if the verification succeeds, the T-Box sends the certificate record received by the T-Box to a GW for verification. If the verification fails, the T-Box determines that the certificate record received by the T-Box is invalid or incorrect, and discards the certificate record. For example, the certificate record received by the T-Box can be verified by the T-Box. The GW receives the certificate record sent by the T-Box, and attempts to verify the signature information in the certificate record. If the verification succeeds, the certificate record has been verified by two vehicle-mounted devices: the GW and the T-Box, and the GW sends the certificate record to domain controllers, such as a BCM, an HMI, a VCU, and an MDC, and another vehicle-mounted device that directly communicates with the GW, such as an OBD system, for verification. If the verification fails, the GW notifies the T-Box that the certificate record is invalid, so that the T-Box discards the certificate record. For example, the certificate record can be verified by the GW. The domain controllers and another vehicle-mounted device that directly communicates with the GW attempt to verify the received certificate record sent by the GW. If the certificate record can be verified by two of these vehicle-mounted devices, the certificate record has been verified by four vehicle-mounted devices, and the T-Box determines that the certificate record is valid, and updates, based on the certificate record received by the T-Box, the certificate list stored in the first vehicle. If the certificate record can be verified by only one domain controller, the one domain controller sends the certificate record to an intra-domain device of the domain controller. If the certificate record can be verified by at least one intra-domain device, the certificate record has been verified by four vehicle-mounted devices, and the T-Box determines that the certificate record is valid, and updates, based on the certificate record received by the T-Box, the certificate list stored in the first vehicle. If the certificate record cannot be verified by at least two vehicle-mounted devices in the foregoing domain controllers and vehicle-mounted device that directly communicates with the GW, the T-Box determines that the certificate record is invalid, and discards the certificate record.

It should be noted that there may be one or more certificate records received by the first vehicle, and each certificate record includes the signature information written by the network side device. The vehicle-mounted device of the first vehicle may attempt to verify certificate records received by the vehicle-mounted device one by one, and use the certificate records that are verified by the network-connected device and the network-connected device, to update the certificate list stored in the first vehicle.

S306: The first vehicle updates, based on the received certificate record, the certificate list stored in the first vehicle.

Optionally, the network-connected device of the first vehicle adds each revoked certificate or each valid certificate in the certificate record received by the network-connected device of the first vehicle to the certificate list of the first vehicle, and sends the certificate list to the non-network-connected device of the first vehicle, to update the certificate list of the first vehicle. The certificate list includes a previously revoked certificate record or a valid certificate, and a newly added revoked certificate or a newly added valid certificate.

In another possible implementation, the network-connected device of the first vehicle generates a new certificate list based on each revoked certificate or each valid certificate in the certificate record received by the network-connected device of the first vehicle, and sends the new certificate list to the non-network-connected device of the first vehicle. The new certificate list includes only a newly added revoked certificate or a newly added valid certificate.

Optionally, the certificate list of the first vehicle may be stored in a form of a certificate record received by the network-connected device of the first vehicle, or may be stored in another form, for example, a blockchain form.

Optionally, the certificate list of the first vehicle is stored in each vehicle-mounted device in the first vehicle in the form of the blockchain. The first vehicle obtains an identifier of a first certificate list data block, where the first certificate list data block is a data block corresponding to the certificate list before update, that is, a certificate list data block generated based on a certificate record received by the network-connected device last time. Then, the network-connected device generates an updated certificate list data block based on the identifier of the first certificate list data block and the certificate record. The updated certificate list data block includes a block header, a block body, a block size, a quantity of certificates (that is, a quantity of revoked certificates or valid certificates in the certificate record), that is, a quantity of certificate records, and the like. The block header of the updated certificate list data block includes the identifier of the first certificate list data block, and the block body of the updated certificate list data block includes the certificate record received by the first vehicle. Finally, the network-connected device sends the generated updated certificate list data block to a non-network-connected device on a vehicle in which the network-connected device is located.

In a possible implementation, the block header of the updated certificate list data block further includes an identifier of the certificate record received by the network-connected device, that is, an identifier of the updated certificate list data block.

For example, composition of the updated certificate list data block generated by the network-connected device is shown in Table 1, and includes the block size, the block header, the block body, and the quantity of certificates. The block size is 2 bytes. The block header includes an identifier of a previous block, that is, the identifier of the first certificate list data block, and the identifier may be a hash value and a Merkle root of the first certificate list data block. The Merkle root is obtained through calculation based on a hash value of a previous block and the certificate record, that is, the identifier of the updated certificate list data block, that is, the identifier of the certificate record. A size of the Merkle root is 32 bytes, and the hash value (identifier) of the previous block is 32 bytes. The quantity of certificates, that is, the quantity of revoked certificates and valid certificates in the certificate record, is 1 byte. The block body includes the certificate record.

TABLE 1

| Data item | | Length |
| --- | --- | --- |
| Block size | | 2 bytes |
| Block header | Identifier of a previous block | 32 bytes |
| | Merkle root | 32 bytes |
| Quantity of certificates | | 1 byte |
| Block body | Certificate record | |

In a possible implementation, the block body of the updated certificate list data block further includes the first certificate list data block.

It should be noted that the certificate list of the first vehicle is stored in the form of the blockchain, and the updated certificate list data block and the first certificate list data block are connected by using identifiers of the two data blocks, so that the stored certificate record can be prevented from being tampered with, and storage space used for storing the certificate list is reduced, thereby reducing loss of the certificate record, and ensuring integrity and security of the certificate list stored in the network-connected device and the vehicle-mounted device.

In addition, the certificate list stored in the first vehicle includes the revoked certificate or the valid certificate that belongs to the first vehicle, and further includes a revoked certificate or a valid certificate that belongs to the second vehicle. The second vehicle is another vehicle other than the first vehicle in the first vehicle group. When the first vehicle in the first vehicle group communicates with the second vehicle in the first vehicle group, the first vehicle may attempt to verify an identity of the second vehicle based on signature information in the revoked certificate or the valid certificate of the second vehicle, to determine validity of the identity of the second vehicle, and ensure security of communication between the first vehicle and the second vehicle.

According to the foregoing process, the certificate record sent by the network side to the first vehicle is the certificate record of the first vehicle or the first vehicle group, and a quantity of the certificate records is relatively small. The fewer certificate records the first vehicle will to store, the smaller storage space used by the first vehicle for storing the certificate list is. When storage space of a device in the vehicle is limited, loss of the certificate record may be reduced, and integrity and security of the certificate list stored in the network-connected device and the vehicle-mounted device may be ensured as much as possible.

The revoked certificate or the valid certificate mentioned in the preceding content is described as follows:

Optionally, the revoked certificate includes one or more of a vehicle identifier, a device identifier, or a device type, where the vehicle identifier is an identifier of a vehicle in which a device corresponding to the revoked certificate is located, and the device identifier is a device identifier of a vehicle-mounted device corresponding to the revoked certificate, and the device type includes a network-connected device or a non-network-connected device. For division of the network-connected device and the non-network-connected device, refer to the foregoing content. Details are not described herein again. The valid certificate includes one or more of a vehicle identifier, a device identifier, or a device type, where the vehicle identifier is an identifier of a vehicle in which a device corresponding to the valid certificate is located, the device identifier is a device identifier of a vehicle-mounted device corresponding to the valid certificate; and the device type is a network-connected device or a non-network-connected device.

In a possible implementation, the device identifier includes a vehicle identifier, and the vehicle identifier is a vehicle identifier of a vehicle in which the vehicle-mounted device corresponding to the device identifier is located. In this case, the device corresponding to the revoked certificate or the valid certificate is strongly bound to the vehicle in which the device is located. If the identifier of the device corresponding to the revoked certificate or the valid certificate is determined, the identifier of the vehicle to which the device corresponding to the revoked certificate or the valid certificate belongs may be determined. Therefore, when delivering the certificate record, the network side device directly determines, based on the device identifier of the vehicle-mounted device, the vehicle in which the vehicle-mounted device is located, thereby improving efficiency of delivering the certificate record by the network side device.

In a possible implementation, the device identifier includes a device type of a vehicle-mounted device corresponding to the device identifier.

In a possible implementation, the device identifier further includes information such as device production time and a device manufacturer.

Usually, the device manufacturer installs a root certificate in the device, which may be a root certificate from the CA. Then, when the device is assembled in the vehicle, the device assembled in the vehicle is registered with an original equipment manufacturer (OEM), that is, a device certificate of the device is determined. When the device in the vehicle is replaced with another vehicle, or the device certificate of the device expires, the device needs to be re-registered with the OEM. If the device identifier of the device corresponding to the device certificate is strongly bound to the vehicle identifier of the vehicle in which the device certificate is located, when the device certificate of the device is determined or updated, the device identifier will be determined and updated again.

Figure 5:
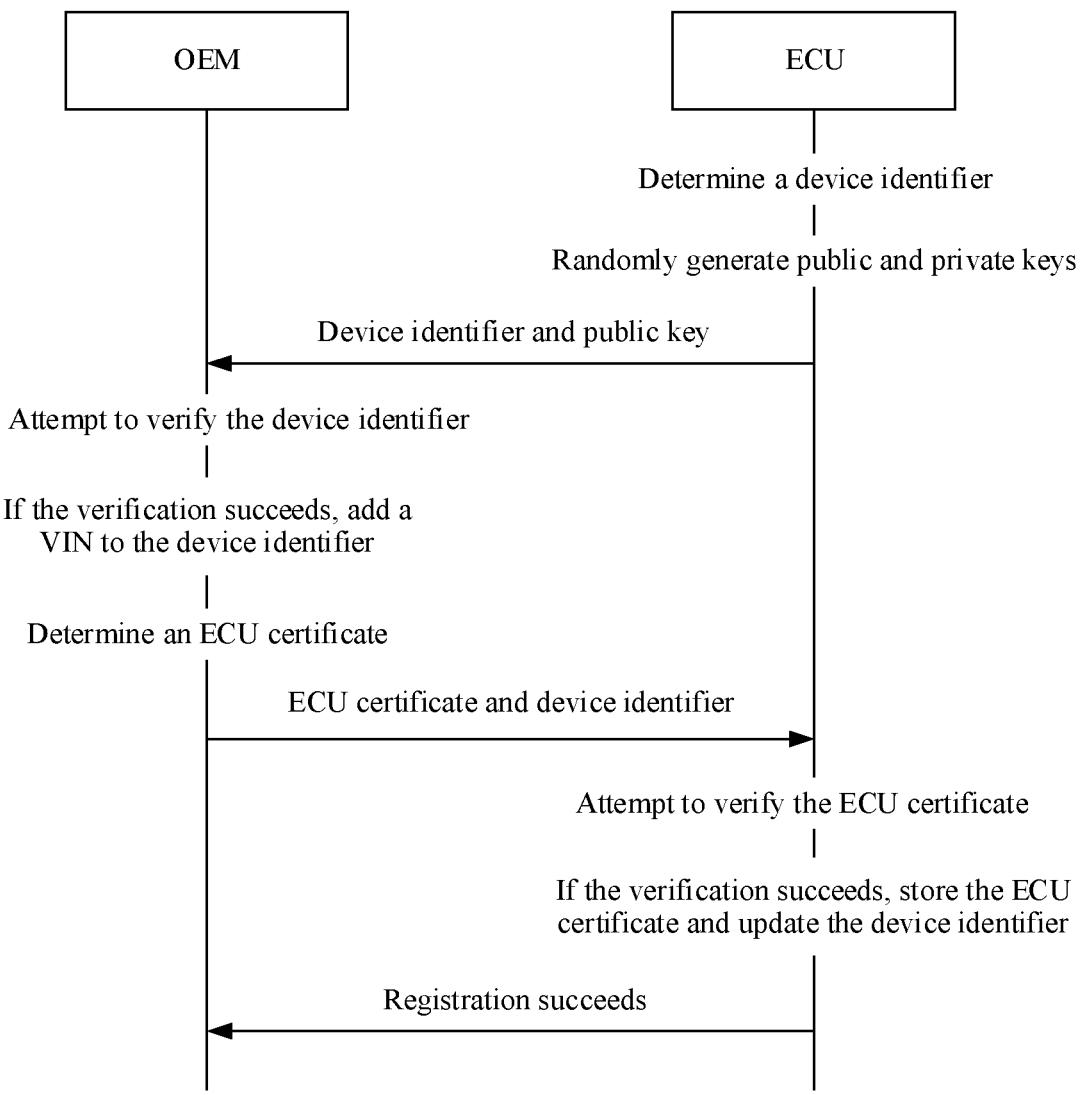
FIG. 5 is a flowchart of a method for performing device registration with an original equipment manufacturer according to an embodiment of this application.

For example, an identifier of a device ECU includes a device type and a vehicle identifier of a vehicle in which the device ECU is located. As shown in FIG. 5, the ECU first determines a device identifier of the ECU based on device information and device identifier coding form of the ECU, where the device information includes information such as a device type, device production time, and a device manufacturer. Then, the ECU randomly generates a pair of public and private keys, writes the private key into a hardware security module (HSM), and sends the device identifier and the public key of the ECU to an OEM by using a network-connected device. The OEM attempts to verify the device identifier based on the received public key to determine whether the device is valid. If the verification succeeds, the OEM determines that the device is valid, and adds a vehicle identification number (VIN) to the device identifier of the ECU. Then, the OEM generates a device certificate of the ECU based on information such as the device identifier of the ECU and the received public key. The OEM sends, to the ECU by using the network-connected device, the device certificate and the device identifier that are of the ECU and that are generated by the OEM. Correspondingly, the ECU receives, by using the network-connected device, the device certificate and the device identifier that are sent by the OEM, and attempts to verify the received device certificate, to determine correctness of the device certificate. After determining that the device certificate is correct, the ECU writes the device certificate to the HSM, stores the device certificate, and updates the device identifier. Finally, the OEM receives a message indicating that the device is registered successfully, and determines that the ECU is registered successfully. Optionally, the OEM further sends the device certificate of the ECU to a vehicle device certificate management system, a CA, and the like. Optionally, the OEM may further determine a validity period of the device certificate.

Optionally, in another possible implementation, the device manufacturer installs a root certificate in a device, and the root certificate may be a root certificate from the CA. Subsequently, if a device type of the device is a non-network-connected device, the device may randomly generate public and private keys, and actively send the device identifier and the public key of the non-network-connected device to the CA by using the network-connected device in the vehicle in which the device is located to perform re-registration, to determine a valid certificate of the non-network-connected device, that is, a new device certificate, to ensure device security.

For example, a device 1 is installed in a vehicle 1, and the device 1 is a non-network-connected device. In this case, a device certificate of the device 1 is a device certificate 1, and the device certificate 1 includes an identifier of the vehicle 1. If the device 1 is transferred from the vehicle 1 to a vehicle 2, the device certificate 1 becomes invalid, and the network side device obtains a revoked certificate about the device 1, and generates a certificate record based on the revoked certificate. Optionally, the certificate record includes the revoked device certificate 1 of the device 1. In addition, the device 1 updates the device certificate of the device 1 to a device certificate 2 by using the network-connected device, where the device certificate 2 includes an identifier of the vehicle 2.

According to the foregoing process, the network side device generates the certificate record of the first vehicle or the first vehicle group based on the obtained revoked certificate or the obtained valid certificate, and the certificate record is a newly added certificate record. Therefore, when storage space of the device in the first vehicle is limited, a quantity of certificate records that need to be stored in the first vehicle is relatively small, so that loss of certificate records that need to be stored in the vehicle-mounted device in the first vehicle can be reduced, thereby ensuring integrity in the certificate list of the first vehicle and ensuring vehicle security.

Figure 6:
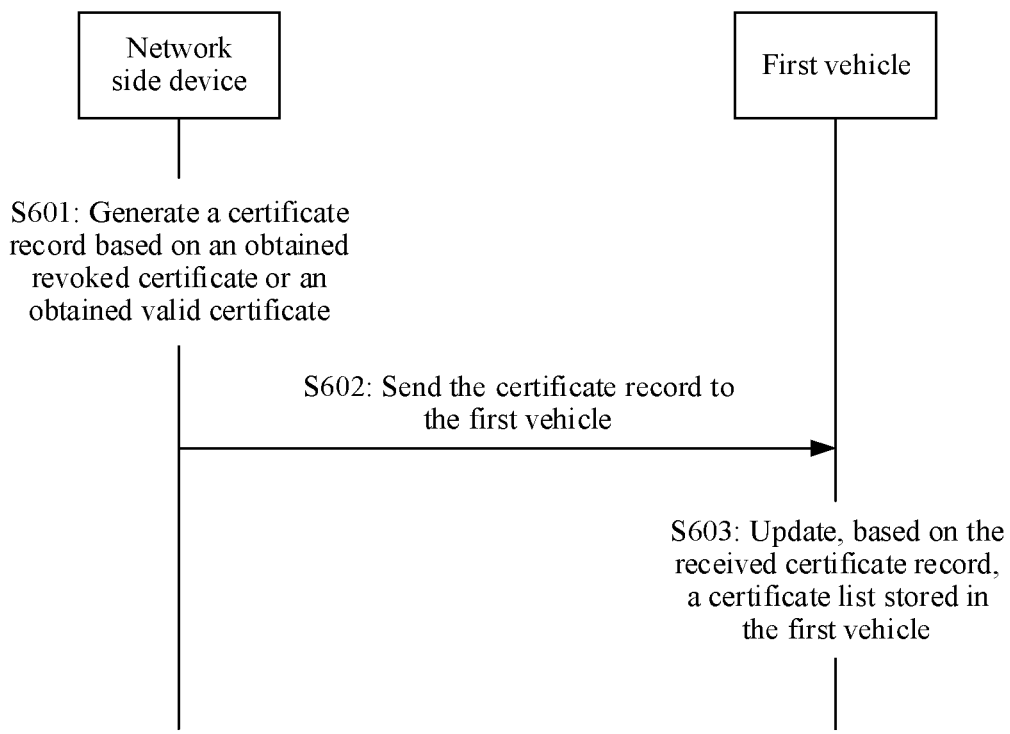
FIG. 6 is a flowchart of a certificate list update method according to an embodiment of this application.

To reduce certificate records that need to be stored in a first vehicle and ensure integrity of a certificate list stored in a vehicle-mounted device, this application further provides a certificate list update method. After obtaining a revoked certificate or a valid certificate, a network side device obtains the revoked certificate or the valid certificate based on the obtained revoked certificate or the obtained valid certificate, to generate a certificate record. Then, the network side device sends the obtained certificate record to the first vehicle. Correspondingly, after obtaining the certificate record sent by the network side device, the first vehicle determines a certificate record that belongs to the first vehicle or a first vehicle group, and updates, based on the certificate record that belongs to the first vehicle or the first vehicle group, the certificate list stored in the first vehicle. As shown in FIG. 6, the certificate list update method mainly includes the following steps S601 to S603.

S601: A network side device generates a certificate record based on an obtained revoked certificate or an obtained valid certificate.

A first vehicle group is any vehicle group in a plurality of vehicle groups, and a first vehicle is any vehicle in the first vehicle group. The certificate record generated by the network side device is used by the first vehicle to update a certificate list stored in the first vehicle. There may be one or more certificate records. The certificate list of the first vehicle is used to record, for the first vehicle, a revoked certificate or a valid certificate of a device that belongs to the first vehicle, or used to record, for the first vehicle group, a revoked certificate or a valid certificate of a device that belongs to the first vehicle group. For descriptions of a vehicle group, refer to the foregoing content.

Optionally, after a certificate of at least one device is revoked, the network side device obtains at least one revoked certificate. After at least one device performs registration, the network side device obtains at least one valid certificate. After obtaining the revoked certificate or the valid certificate, the network side device generates the certificate record based on a vehicle in which a device corresponding to the revoked certificate or the valid certificate is located. The certificate record includes at least one revoked certificate or at least one valid certificate.

It should be noted that the certificate record generated by the network side device is a newly added certificate record. Compared with sending both an existing certificate record and the newly added certificate record to the device of the first vehicle for storage, sending the newly added certificate record to the device of the first vehicle for storage can reduce space used by the device for storing a currently received certificate record when storage space of the device is limited, thereby reducing loss of the certificate record stored in the device, and ensuring integrity of a certificate list stored in a vehicle-mounted device and ensuring vehicle security.

S602: The network side device sends the certificate record to the first vehicle.

The network side device sends the certificate record generated by the network side device to a network-connected device of the first vehicle. Correspondingly, the network-connected device of the first vehicle receives the certificate record sent by the network side device.

S603: The first vehicle updates, based on the certificate record received by the first vehicle, the certificate list stored in the first vehicle.

The network-connected device of the first vehicle determines, based on a device identifier of a device corresponding to the revoked certificate or the valid certificate in the certificate record received by the network-connected device of the first vehicle and a vehicle identifier of a vehicle in which the device is located, at least one revoked certificate or at least one valid certificate of the device that belongs to the first vehicle or the first vehicle group in the received certificate record. Then, the at least one revoked certificate or the at least one valid certificate that belongs to the first vehicle or the first vehicle group is added to the certificate list of the first vehicle, and the certificate list is sent to a non-network-connected device in the first vehicle, to update the certificate list of the first vehicle. The certificate list includes a previously revoked certificate record or a valid certificate, and a newly added revoked certificate or a newly added valid certificate.

In another possible implementation, the network-connected device of the first vehicle determines, based on a device identifier of a device corresponding to the revoked certificate or the valid certificate in the certificate record received by the network-connected device of the first vehicle and a vehicle identifier of a vehicle in which the device is located, at least one revoked certificate or at least one valid certificate of the device that belongs to the first vehicle or the first vehicle group in the received certificate record. Then, the network-connected device of the first vehicle generates a new certificate list based on the at least one revoked certificate or the at least one valid certificate that is in the certificate record received by the network-connected device of the first vehicle and that is of the device that belongs to the first vehicle or the first vehicle group, and sends the new certificate list to the non-network-connected device in the first vehicle. The new certificate list includes only a newly added revoked certificate or a newly added valid certificate that belongs to the first vehicle or the first vehicle group.

It should be noted that, in the foregoing process, the network side device generates the newly added certificate record based on the revoked certificate or the valid certificate obtained by the network side device and the vehicle in which the device corresponding to the revoked certificate or the valid certificate is located, and sends the newly added certificate record to the first vehicle. Then, the first vehicle determines, based on the received certificate record, the revoked certificate or the valid certificate that is in the certificate record and that belongs to the first vehicle or the first vehicle group, and updates, based on the revoked certificate or the valid certificate that belongs to the first vehicle or the first vehicle group, the certificate list stored in the first vehicle. In conclusion, the certificate record generated by the network side is a certificate record of the newly added revoked certificate or the newly added valid certificate, and the first vehicle is stored only the certificate record of the first vehicle or the first vehicle group. Therefore, the first vehicle receives a relatively small quantity of certificate records that need to be stored, and storage space for storing the certificate list obtained based on the certificate record is relatively small. In this case, when storage space of the device in the vehicle is limited, loss of certificate records that need to be stored in the vehicle can be reduced, thereby ensuring integrity of the certificate list stored in the vehicle as much as possible, and ensuring vehicle security.

Figure 7:
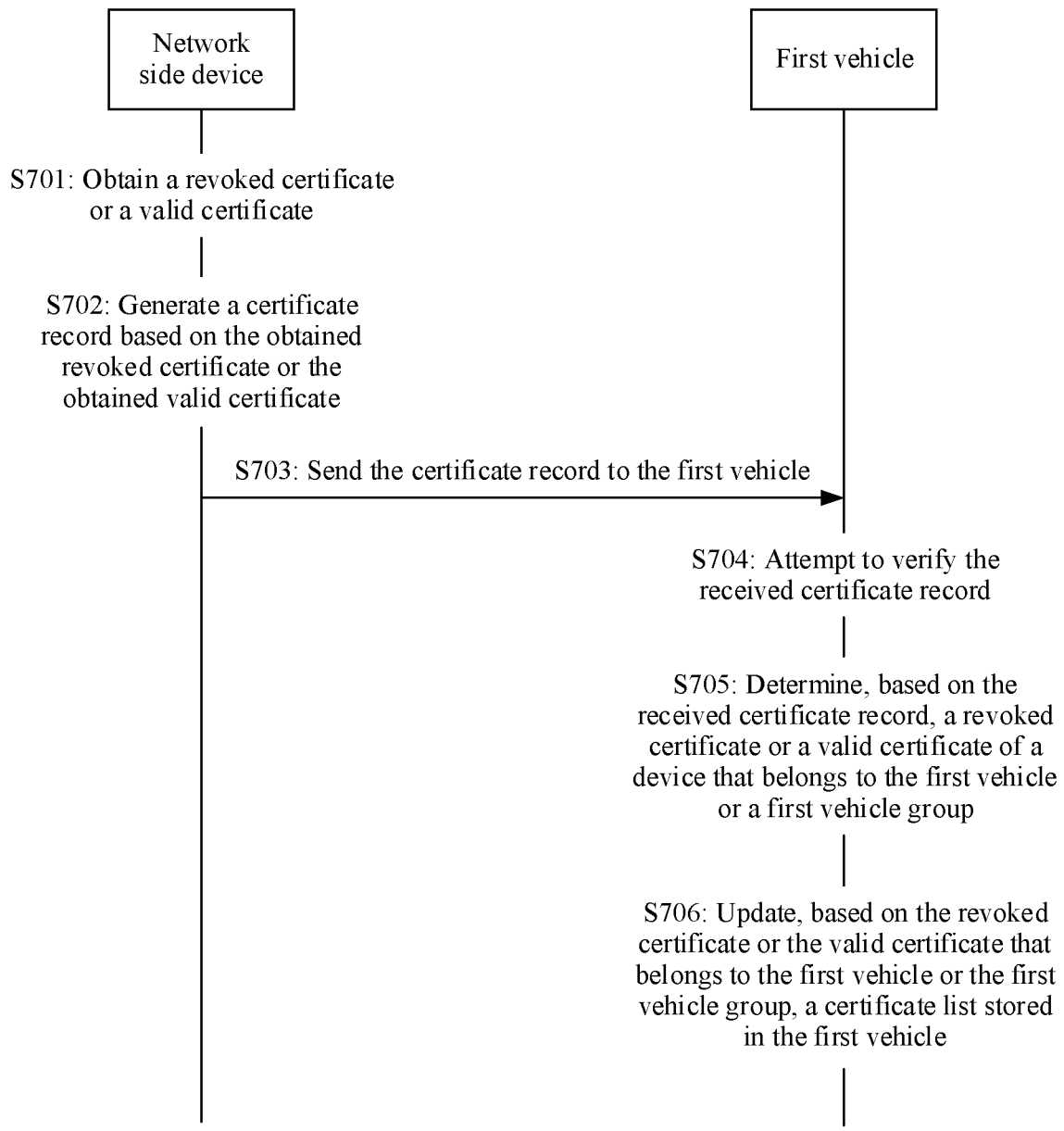
FIG. 7 is a flowchart of a certificate list update method according to an embodiment of this application.

To reduce certificate records that need to be stored in a first vehicle, and ensure integrity of a vehicle-mounted certificate list stored in a vehicle-mounted device, this application further provides a certificate list update method. As shown in FIG. 7, the method includes steps S701 to S706.

S701: A network side device obtains a revoked certificate or a valid certificate.

For descriptions of the revoked certificate or the valid certificate, refer to the foregoing content.

Optionally, for specific implementation of this step, refer to step S301. Details are not described herein again.

S702: The network side device obtains the revoked certificate or the valid certificate, and generates a certificate record.

Optionally, the network side device generates a certificate record based on an obtained at least one revoked certificate or an obtained at least one valid certificate. This certificate record is a certificate record of newly added revoked certificates or newly added valid certificates of all vehicles.

In another possible implementation, the network side device obtains a number of the revoked certificate or the valid certificate, and a user queries a vehicle certificate management system based on the number, to determine a revoked certificate or a valid certificate corresponding to the number, and determine an identifier of a vehicle in which a device corresponding to the revoked certificate or the valid certificate is located, an identifier of a vehicle group in which the vehicle is located, and identifiers of all vehicles in the vehicle group. Subsequently, the network side device generates the certificate record based on information obtained by the network side device from the vehicle certificate management system. The certificate record includes the number of the revoked certificate or the valid certificate, the identifier of the vehicle, an identifier of a network-connected device of the vehicle, and the identifier of the device corresponding to the revoked certificate or the valid certificate.

In a possible implementation, a CA performs steps S701 and S702. The CA and the vehicle certificate management system may be located on a same server of the network side device, or may be located on different servers of the network side device.

S703: The network side device sends the certificate record to a first vehicle.

The network side device sends all certificate records generated by the network side device to a network-connected device of the first vehicle. Correspondingly, the network-connected device of the first vehicle receives the certificate record sent by the network side device.

S704: The first vehicle attempts to verify the certificate record received by the first vehicle.

Optionally, for specific implementation of step S704, refer to step S305. Details are not described herein again.

It should be noted that there may be one or more certificate records received by the first vehicle, and each certificate record includes signature information written by the network side device. A vehicle-mounted device of the first vehicle may attempt to verify certificate records received by the vehicle-mounted device one by one, and use the certificate records that are verified by the network-connected device and a network-connected device, to update a certificate list stored in the first vehicle.

S705: The first vehicle determines, based on the received certificate record, a revoked certificate or a valid certificate that is in the certificate record and that is of a device that belongs to the first vehicle or a first vehicle group.

The network-connected device of the first vehicle determines, based on a device identifier of a device corresponding to the revoked certificate or the valid certificate in the certificate record received by the network-connected device of the first vehicle, or a vehicle identifier of a vehicle in which the device is located, the revoked certificate or the valid certificate of the device that belongs to the first vehicle or the first vehicle group.

Optionally, step S705 may be performed before step S704.

S706: The first vehicle updates, based on the revoked certificate or the valid certificate of the device that belongs to the first vehicle or the first vehicle group, the certificate list stored in the first vehicle.

Optionally, the network-connected device of the first vehicle adds the revoked certificate or the valid certificate of the device that belongs to the first vehicle or the first vehicle group to the certificate list of the first vehicle, and sends the certificate list to the non-network-connected device in the first vehicle, to update the certificate list of the first vehicle. The certificate list includes a previously revoked certificate record or a valid certificate, and a newly added revoked certificate or a newly added valid certificate.

In another possible implementation, the network-connected device of the first vehicle generates a new certificate list based on each revoked certificate or each valid certificate that is in the certificate record and that belongs to the first vehicle or the first vehicle group, and sends the certificate list to the non-network-connected device in the first vehicle. The new certificate list includes only a newly added revoked certificate or a newly added valid certificate.

Optionally, the certificate list of the first vehicle is stored on each device in the first vehicle in a form of a blockchain. The certificate list is used to record, for the first vehicle or the first vehicle group, the revoked certificate or the valid certificate of the device that belongs to the first vehicle or the first vehicle group. For specific implementation in which the certificate list of the first vehicle is stored in the form of the blockchain, refer to the description of step S306. Details are not described herein again.

It should be noted that the certificate list of the first vehicle is stored in the form of the blockchain, and an updated certificate list data block and a first certificate list data block are connected by using identifiers of the two data blocks, so that the stored certificate record can be prevented from being tampered with, and storage space used for storing the certificate list is reduced, thereby reducing loss of the certificate record, and ensuring integrity and security of the certificate list stored in the network-connected device and the non-network-connected device.

In addition, the certificate list stored in the first vehicle includes the revoked certificate or the valid certificate that belongs to the first vehicle, and further includes a revoked certificate or a valid certificate that belongs to a second vehicle. The second vehicle is another vehicle other than the first vehicle in the first vehicle group. When the first vehicle in the first vehicle group communicates with the second vehicle in the first vehicle group, the first vehicle may attempt to verify an identity of the second vehicle based on signature information in the revoked certificate or the valid certificate of the second vehicle, to determine validity of the identity of the second vehicle, and ensure security of communication between the first vehicle and the second vehicle.

According to the foregoing process, the certificate records sent by the network side device to the first vehicle is newly added certificate records of all vehicles, and certificate records that need to be stored in the first vehicle is a certificate record corresponding to the revoked certificate or the valid certificate of the first vehicle or the first vehicle group. Therefore, the first vehicle needs to store a relatively small quantity of certificate records, and storage space for storing the certificate list by the first vehicle is smaller. When storage space of the device in the vehicle is limited, in this embodiment of this application, loss of the certificate record can be reduced, and integrity and security of the certificate list stored in the network-connected device and the non-network-connected device can be ensured as much as possible.

Figure 8:
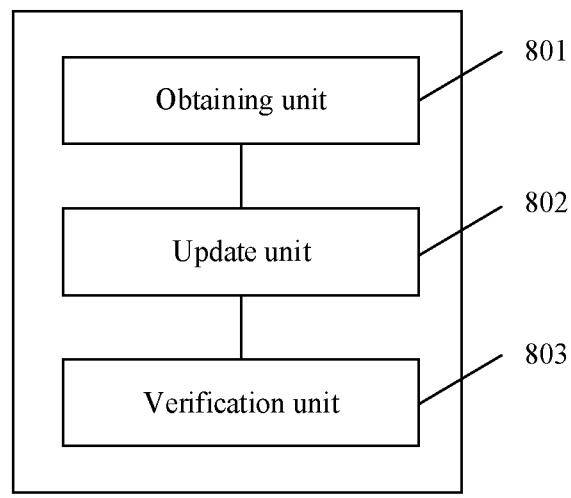
FIG. 8 is a structural block diagram of a certificate list update apparatus according to an embodiment of this application.

This application further provides a certificate list update apparatus. The apparatus is applied to a first vehicle, and the apparatus is configured to perform operations performed by the first vehicle in the method embodiments shown in FIG. 2 and FIG. 3. The apparatus may alternatively be a road side unit (RSU). As shown in FIG. 8, the apparatus includes an obtaining unit 801, an update unit 802, and a verification unit 803.

The obtaining unit 801 is configured to obtain a certificate record.

The certificate record is sent by a network side device to the first vehicle, and the certificate record includes at least one revoked certificate or at least one valid certificate.

In a possible implementation, the revoked certificate includes one or more of a vehicle identifier, a device identifier, or a device type. The valid certificate includes one or more of a vehicle identifier, a device identifier, or a device type. The device type is a network-connected device or a non-network-connected device.

In a possible implementation, the device identifier includes a vehicle identifier, and the vehicle identifier is an identifier of a vehicle in which a vehicle-mounted device corresponding to the device identifier is located.

The update unit 802 is configured to update, based on the certificate record, a certificate list stored in the first vehicle.

The certificate list is used to record, for the first vehicle, a revoked certificate or a valid certificate of a device that belongs to the first vehicle, or used to record, for the first vehicle group, a revoked certificate or a valid certificate of a device that belongs to the first vehicle group. The first vehicle group includes the first vehicle.

Optionally, the certificate record obtained by the obtaining unit 801 is generated by the network side device for the first vehicle or the first vehicle group, and each revoked certificate or each valid certificate in the certificate record is a certificate of the device that belongs to the first vehicle or the first vehicle group. In this case, that the update unit 802 is configured to update, based on the certificate record, the certificate list stored in the first vehicle includes: adding each revoked certificate or each valid certificate in the certificate record to the certificate list of the first vehicle.

In a possible implementation, that the update unit 802 is configured to update, based on the certificate record, the certificate list stored in the first vehicle includes: obtaining an identifier of a first certificate list data block, where the first certificate list data block is a data block corresponding to the certificate list before update; and generating an updated certificate list data block based on the identifier of the first certificate list data block and the certificate record obtained by the obtaining unit 801, where the updated certificate list data block includes a block header and a block body, the block header of the updated certificate list data block includes the identifier of the first certificate list data block, and the block body of the updated certificate list data block includes the certificate record.

In a possible implementation, the block header of the updated certificate list data block further includes an identifier of the certificate record obtained by the obtaining unit 801.

In a possible implementation, the block body of the updated certificate list data block further includes the first certificate list data block.

In a possible implementation, the identifier of the first certificate list data block is a hash value generated based on the first certificate list data block, and the identifier of the certificate record is a hash value generated based on the certificate record.

Optionally, before the update unit 802 is configured to update, based on the certificate record, the certificate list stored in the first vehicle, the apparatus further includes the verification unit 803. The verification unit 803 is configured to attempt to verify the certificate record based on signature information in the certificate record obtained by the obtaining unit 801. If the verification succeeds, the update unit 802 is further configured to update, based on the certificate record, the certificate list stored in the first vehicle.

Optionally, the certificate list of the first vehicle further includes a revoked certificate or a valid certificate of a device that belongs to a second vehicle, and the second vehicle is another vehicle other than the first vehicle in the first vehicle group. The revoked certificate or the valid certificate of the device of the second vehicle is used by the first vehicle to attempt to authenticate the second vehicle.

Figure 9:
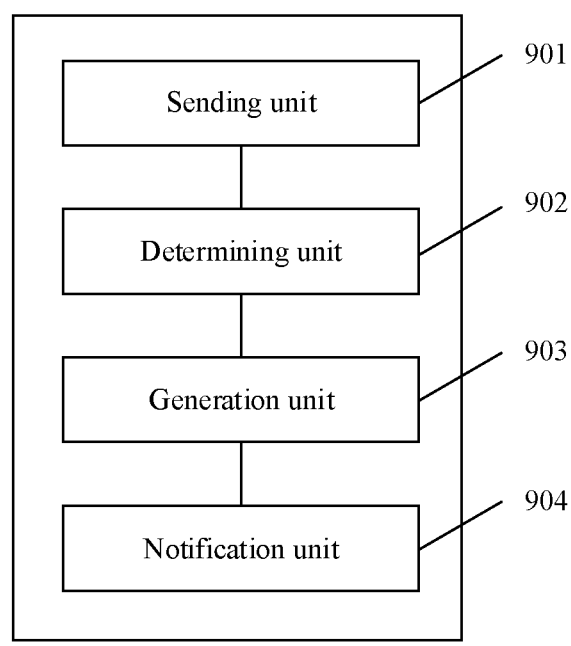
FIG. 9 is a structural block diagram of a certificate list update apparatus according to an embodiment of this application.

This application further provides a certificate list update apparatus. The apparatus is applied to a network side device, and the apparatus is configured to perform operations performed by the network side device in the method embodiments shown in FIG. 2 and FIG. 3. As shown in FIG. 9, the apparatus includes a sending unit 901, a determining unit 902, a generation unit 903, and a notification unit 904.

The sending unit 901 is configured to send a certificate record to a first vehicle.

The certificate record includes at least one revoked certificate or at least one valid certificate, and the certificate record is used by the first vehicle to update a certificate list stored in the first vehicle. The certificate list is used to record, for the first vehicle, a revoked certificate or a valid certificate of a device that belongs to the first vehicle, or used to record, for the first vehicle group, a revoked certificate or a valid certificate of a device that belongs to the first vehicle group. The first vehicle group includes at least the first vehicle.

In a possible implementation, the revoked certificate includes one or more of a vehicle identifier, a device identifier, or a device type. The valid certificate includes one or more of a vehicle identifier, a device identifier, or a device type. The device type is a network-connected device or a non-network-connected device.

In a possible implementation, the device identifier includes a vehicle identifier, and the vehicle identifier is an identifier of a vehicle in which a vehicle-mounted device corresponding to the device identifier is located.

Optionally, before the sending unit 901 sends the certificate record to the first vehicle, the apparatus further includes the determining unit 902 and the generation unit 903. The determining unit 902 is configured to determine at least one revoked certificate or at least one valid certificate of a device that belongs to the first vehicle or the first vehicle group. The generation unit 903 is configured to generate the certificate record of the first vehicle or the first vehicle group based on the at least one revoked certificate or the at least one valid certificate of the device that belongs to the first vehicle or the first vehicle group.

In a possible implementation, that the determining unit 902 is configured to determine the at least one revoked certificate or the at least one valid certificate of the device that belongs to the first vehicle or the first vehicle group includes: determining, based on device identifiers or vehicle identifiers in revoked certificates or valid certificates, the at least one revoked certificate or the at least one valid certificate of the device that belongs to the first vehicle or the first vehicle group.

In a possible implementation, that the determining unit 902 is configured to determine the at least one revoked certificate or the at least one valid certificate of the device that belongs to the first vehicle or the first vehicle group includes: determining, by querying a vehicle certificate management system, the at least one revoked certificate or the at least one valid certificate of the device that belongs to the first vehicle or the first vehicle group.

In a possible implementation, before the generation unit 903 is configured to generate the certificate record of the first vehicle or the first vehicle group based on the at least one revoked certificate or the at least one valid certificate of the device that belongs to the first vehicle or the first vehicle group, the determining unit 902 is further configured to determine that a device corresponding to the at least one revoked certificate does not include the network-connected device. In this case, that the sending unit 901 is configured to send the certificate record to the first vehicle includes: sending the certificate record to the network-connected device in the first vehicle.

In a possible implementation, before the generation unit 903 is configured to generate the certificate record of the first vehicle or the first vehicle group based on the at least one revoked certificate or the at least one valid certificate of the device that belongs to the first vehicle or the first vehicle group, the determining unit 902 is further configured to determine that a device corresponding to the at least one revoked certificate includes the network-connected device, and then the notification unit 904 notifies a user of the first vehicle to re-register with the network-connected device. Finally, the determining unit 902 determines that the user has re-registered with the network-connected device. In this case, that the sending unit 901 is configured to send the certificate record to the first vehicle includes: sending the certificate record to the network-connected device in the first vehicle.

This application further provides a certificate list update apparatus. The apparatus is applied to a first vehicle, and the apparatus is configured to perform operations performed by the first vehicle in the method embodiments shown in FIG. 6 and FIG. 7. As shown in FIG. 8, the apparatus includes an obtaining unit 801, an update unit 802, and a verification unit 803.

The obtaining unit 801 is configured to obtain a certificate record.

The certificate record is sent by a network side device to the first vehicle, and the certificate record includes at least one revoked certificate or at least one valid certificate.

In a possible implementation, the revoked certificate includes one or more of a vehicle identifier, a device identifier, or a device type. The valid certificate includes one or more of a vehicle identifier, a device identifier, or a device type. The device type is a network-connected device or a non-network-connected device.

In a possible implementation, the device identifier includes a vehicle identifier, and the vehicle identifier is an identifier of a vehicle in which a vehicle-mounted device corresponding to the device identifier is located.

The update unit 802 is configured to update, based on the certificate record, a certificate list stored in the first vehicle.

The certificate list is used to record, for the first vehicle, a revoked certificate or a valid certificate of a device that belongs to the first vehicle, or used to record, for the first vehicle group, a revoked certificate or a valid certificate of a device that belongs to the first vehicle group. The first vehicle group includes the first vehicle.

Optionally, that the update unit 802 is configured to update, based on the certificate record, the certificate list stored in the first vehicle includes: determining at least one revoked certificate or at least one valid certificate that is in the certificate record and that is of the device that belongs to the first vehicle or the first vehicle group, and adding the at least one revoked certificate or the at least one valid certificate of the device that belongs to the first vehicle or the first vehicle group to the certificate list of the first vehicle.

In a possible implementation, that the update unit 802 is configured to update, based on the certificate record, the certificate list stored in the first vehicle includes: obtaining an identifier of a first certificate list data block, where the first certificate list data block is a data block corresponding to the certificate list before update; and generating an updated certificate list data block based on the identifier of the first certificate list data block and the certificate record obtained by the obtaining unit 801, where the updated certificate list data block includes a block header and a block body, the block header of the updated certificate list data block includes the identifier of the first certificate list data block, and the block body of the updated certificate list data block includes the certificate record.

In a possible implementation, the block header of the updated certificate list data block further includes an identifier of the certificate record obtained by the obtaining unit 801.

In a possible implementation, the block body of the updated certificate list data block further includes the first certificate list data block.

In a possible implementation, the identifier of the first certificate list data block is a hash value generated based on the first certificate list data block, and the identifier of the certificate record is a hash value generated based on the certificate record.

Optionally, before the update unit 802 is configured to update, based on the certificate record, the certificate list stored in the first vehicle, the apparatus further includes the verification unit 803. The verification unit 803 is configured to attempt to verify the certificate record based on signature information in the certificate record obtained by the obtaining unit 801. If the verification succeeds, the update unit 802 is further configured to update, based on the certificate record, the certificate list stored in the first vehicle.

Optionally, the certificate list of the first vehicle further includes a revoked certificate or a valid certificate of a device that belongs to a second vehicle, and the second vehicle is another vehicle other than the first vehicle in the first vehicle group. The revoked certificate or the valid certificate of the device of the second vehicle is used by the first vehicle to attempt to authenticate the second vehicle.

This application further provides a certificate list update apparatus. The apparatus is applied to a network side device, and the apparatus is configured to perform operations performed by the network side device in the method embodiments shown in FIG. 6 and FIG. 7. As shown in FIG. 9, the apparatus includes a sending unit 901, a determining unit 902, a generation unit 903, and a notification unit 904.

The sending unit 901 is configured to send a certificate record to a first vehicle.

The certificate record includes at least one revoked certificate or at least one valid certificate, and the certificate record is used by the first vehicle to update a certificate list stored in the first vehicle. The certificate list is used to record, for the first vehicle, a revoked certificate or a valid certificate of a device that belongs to the first vehicle, or used to record, for the first vehicle group, a revoked certificate or a valid certificate of a device that belongs to the first vehicle group. The first vehicle group includes at least the first vehicle.

In a possible implementation, the revoked certificate includes one or more of a vehicle identifier, a device identifier, or a device type. The valid certificate includes one or more of a vehicle identifier, a device identifier, or a device type. The device type is a network-connected device or a non-network-connected device.

In a possible implementation, the device identifier includes a vehicle identifier, and the vehicle identifier is an identifier of a vehicle in which a vehicle-mounted device corresponding to the device identifier is located.

Optionally, before the sending unit 901 sends the certificate record to the first vehicle, the apparatus further includes the generation unit 903. The generation unit 903 is configured to generate the certificate record based on the at least one revoked certificate or the at least one valid certificate.

In a possible implementation, before the generation unit 903 is configured to generate the certificate record based on the at least one revoked certificate or the at least one valid certificate, the determining unit 902 is configured to determine that a device corresponding to the at least one revoked certificate does not include the network-connected device. In this case, that the sending unit 901 is configured to send the certificate record to the first vehicle includes: sending the certificate record to the network-connected device in the first vehicle.

In a possible implementation, before the generation unit 903 is configured to generate the certificate record based on the at least one revoked certificate or the at least one valid certificate, the determining unit 902 is further configured to determine that a device corresponding to the at least one revoked certificate includes the network-connected device, and then the notification unit 904 notifies a user of the first vehicle to re-register with the network-connected device. Finally, the determining unit 902 determines that the user has re-registered with the network-connected device. In this case, that the sending unit 901 is configured to send the certificate record to the first vehicle includes: sending the certificate record to the network-connected device in the first vehicle.

One or more of the units in FIG. 8 and FIG. 9 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

Figure 10:
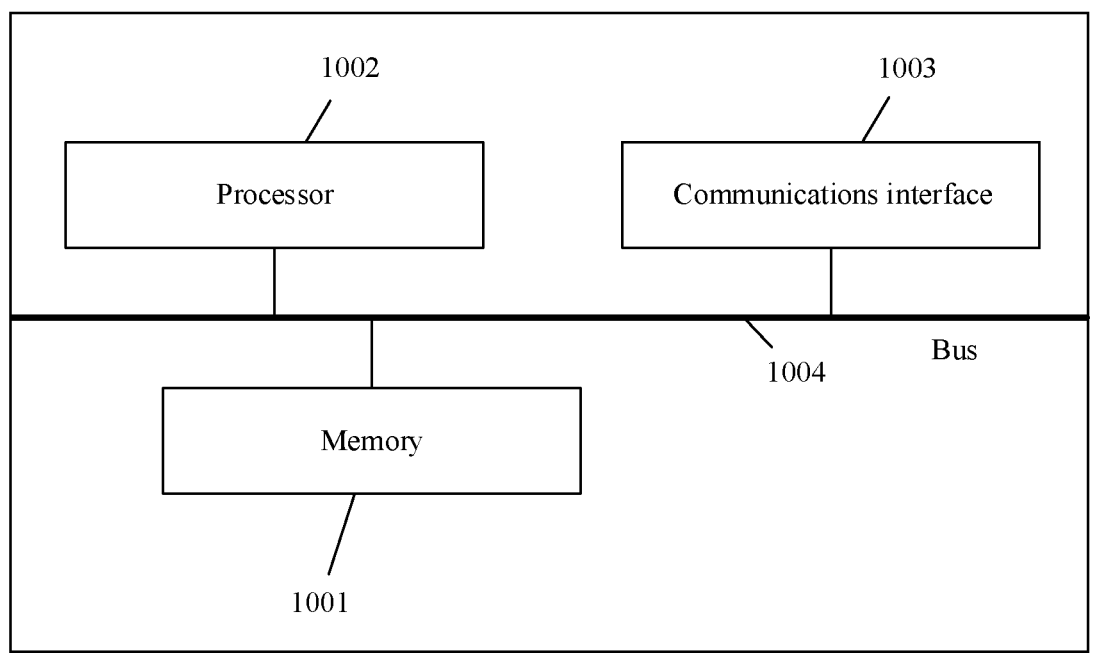
FIG. 10 is a structural block diagram of a certificate list update apparatus according to an embodiment of this application.

Referring to FIG. 10, this application further provides a certificate list update apparatus. The apparatus is applied to a first vehicle, and may be configured to perform operations performed by the first vehicle in the method embodiments shown in FIG. 2, FIG. 3, FIG. 6, and FIG. 7. The apparatus includes a memory 1001, a processor 1002, a communications interface 1003, and a bus 1004. The processor 1002 is configured to run computer program instructions, so that the certificate list update apparatus performs operations performed by the first vehicle in the certificate list update methods shown in FIG. 2, FIG. 3, FIG. 6, and FIG. 7. The communications interface 1003 is configured to support communication between the apparatus and another network entity. The memory 1001 is configured to store program code and data of the apparatus.

This application further provides a certificate list update apparatus. The apparatus is applied to a network side device, and may be configured to perform operations performed by the network side device in the method embodiments shown in FIG. 2, FIG. 3, FIG. 6, and FIG. 7. For a structure of the apparatus, refer to FIG. 10, and the apparatus includes a memory 1001, a processor 1002, a communications interface 1003, and a bus 1004. The processor 1002 is configured to run computer program instructions, so that the certificate list update apparatus performs operations performed by the network side device in the certificate list update methods shown in FIG. 2, FIG. 3, FIG. 6, and FIG. 7. The communications interface 1003 is configured to support communication between the apparatus and another network entity. The memory 1001 is configured to store program code and data of the apparatus.

The processor 1002 (or described as a controller) may implement or execute various example logical blocks, units, unit modules, and circuits described with reference to content disclosed in this application. The processor or the controller may be a central processing unit, a general purpose processor, a digital signal processor, an application specific integrated circuit, a field programmable gate array or another programmable logic device, a transistor logic device, a hardware component, or any combination thereof. The processor or the controller may implement or execute various example logical blocks, unit modules, and circuits described with reference to content disclosed in this application. Alternatively, the processor 1002 may alternatively be a combination of processors implementing a computing function, for example, a combination of one or more microprocessors or a combination of the DSP and a microprocessor.

The communications interface 1003 may be a transceiver circuit.

The memory 1001 may include a volatile memory, for example, a random access memory. The memory may alternatively include a non-volatile memory, for example, a read-only memory, a flash memory, a hard disk, or a solid-state drive. The memory may alternatively include a combination of the foregoing types of memories.

The bus 1004 may be an extended industry standard architecture (EISA) bus or the like. The bus 1004 may be classified into an address bus, a data bus, a control bus, and the like. For ease of representation, only one thick line is used to represent the bus in FIG. 10, but this does not mean that there is only one bus or only one type of bus.

An embodiment of this application provides a computer-readable storage medium, including computer instructions. When the computer instructions are run by a processor, the certificate list update apparatus is enabled to perform operations performed by the first vehicle or the network side device in the certificate list update methods provided in FIG. 2, FIG. 3, FIG. 6, and FIG. 7.

An embodiment of this application further provides a computer program product including instructions. When the instructions are run on a computer, the computer is enabled to perform operations performed by the first vehicle or the network side device in the certificate list update methods shown in FIG. 2, FIG. 3, FIG. 6, and FIG. 7.

This application further provides a certificate list update system. The system includes the foregoing certificate list update apparatus on a network side and the certificate list update apparatus on a vehicle side.

It may be clearly understood by a person skilled in the art that, for convenient and brief description, for a detailed working process of the foregoing system, apparatus, and unit, refer to a corresponding process in the foregoing method embodiments, and details are not described herein again.

A person skilled in the art may be clearly aware that, the descriptions of the embodiments provided in this application may be referred to each other. For convenience and conciseness, for example, for functions of the apparatuses and devices provided in the embodiments of this application and the performed steps, refer to related descriptions of the method embodiments of this application. The method embodiments and the apparatus embodiments may also be referred to each other.

All or some of the foregoing embodiments may be implemented by using software, hardware, firmware, or any combination thereof. When the all or some of the foregoing embodiments are implemented by using a software program, all or some of the foregoing embodiments may appear in a form of a computer program product, and the computer program product includes one or more computer instructions. When the computer program instructions are loaded and executed on a computer, the procedures or functions according to the embodiments of this application are completely or partially generated.

The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state disk, SSD)), or the like.

The foregoing description about the implementations allows a person skilled in the art to clearly understand that, for the purpose of convenient and brief description, division into only the foregoing function modules is used as an example for description. During actual application, the foregoing functions can be allocated to different function modules for implementation. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. In an application process, some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a device (which may be a personal computer, a server, a network device, or the like) or a processor to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application.

What is claimed is:

1. A certificate list update apparatus, comprising at least one processor and at least one memory, wherein the at least one memory stores program instructions, and the at least one processor is coupled to the at least one memory to execute the instructions to:
   receive a certificate record, wherein the certificate record is sent by a network side device to a first vehicle, and the certificate record comprises at least one revoked certificate or at least one valid certificate, wherein the at least one revoked certificate or the at least one valid certificate comprises a vehicle identifier; and
   update, based on the certificate record, a certificate list stored in the first vehicle, wherein the certificate list is used to record a revoked certificate or a valid certificate of a device that belongs to the first vehicle, or used to record a revoked certificate or a valid certificate of a device that belongs to a first vehicle group, wherein the first vehicle group comprises the first vehicle, and wherein the update, based on the certificate record, a certificate list stored in the first vehicle
   obtain an identifier of a first certificate list data block, wherein the first certificate list data block is a data block corresponding to the certificate list before update; and
   generate an updated certificate list data block based on the identifier of the first certificate list data block and the certificate record, wherein the updated certificate list data block comprises a block header and a block body, the block header of the updated certificate list data block comprises a hash value of the first certificate list data block, and the block body of the updated certificate list data block comprises the revoked certificate or the valid certificate that is in the certificate record and that is of the device that belongs to the first vehicle or the first vehicle group.

2. The certificate list update apparatus according to claim 1, wherein each revoked certificate or each valid certificate comprised in the certificate record is a certificate of the device that belongs to the first vehicle or the first vehicle group.

3. The certificate list update apparatus according to claim 2, wherein the at least one processor is coupled to the at least one memory to execute the instructions to:
add each revoked certificate or each valid certificate in the certificate record to the certificate list.

4. The certificate list update apparatus according to claim 1, wherein the at least one processor is coupled to the at least one memory to execute the instructions to:
determine at least one revoked certificate or at least one valid certificate that is in the certificate record and that is of the device that belongs to the first vehicle or the first vehicle group; and
add the at least one revoked certificate or the at least one valid certificate of the device that belongs to the first vehicle or the first vehicle group to the certificate list.

5. The certificate list update apparatus according to claim 1, wherein the first vehicle group further comprises a second vehicle, the certificate list further comprises a revoked certificate or a valid certificate of a device that belongs to the second vehicle, and the revoked certificate or the valid certificate of the device that belongs to the second vehicle is used by the first vehicle to attempt to authenticate the second vehicle.

6. The certificate list update apparatus according to claim 1, wherein the block header of the updated certificate list data block comprises an identifier of the certificate record.

7. The certificate list update apparatus according to claim 1, wherein the block body of the updated certificate list data block comprises the first certificate list data block.

8. The certificate list update apparatus according to claim 1, wherein the at least one processor is coupled to the at least one memory to execute the instructions to:
determine the certificate record is verified successfully based on signature information in the certificate record; and
update, based on the certificate record, the certificate list stored in the first vehicle.

9. A certificate list update apparatus, comprising at least one processor and at least one memory, wherein the at least one memory stores program instructions, and the at least one processor is coupled to the at least one memory to execute the instructions to:
determine at least one revoked certificate or at least one valid certificate of a device that belongs to a first vehicle or a first vehicle group, wherein the first vehicle belongs to the first vehicle group, wherein the determine at least one revoked certificate or at least one valid certificate of a device that belongs to a first vehicle or a first vehicle group comprises:
send a query from a network device to a vehicle certificate management system, wherein the query requests the at least one revoked certificate or the at least one valid certificate of the device that belongs to the first vehicle or the first vehicle group;
generate a certificate record, wherein the certificate record comprises the at least one revoked certificate or the at least one valid certificate of the device that belongs to the first vehicle or the first vehicle group, wherein the at least one revoked certificate or the at least one valid certificate comprises a vehicle identifier; and
send the certificate record to the first vehicle.

10. The certificate list update apparatus according to claim 9, wherein the at least one processor is coupled to the at least one memory to execute the instructions to:
determine, based on device identifiers or vehicle identifiers in revoked certificates or valid certificates, the at least one revoked certificate or the at least one valid certificate of the device that belongs to the first vehicle or the first vehicle group.

11. The certificate list update apparatus according to claim 9, wherein the at least one processor is coupled to the at least one memory to execute the instructions to:
determine that the device corresponding to the at least one revoked certificate does not comprise a network-connected device; and
send the certificate record to a network-connected device in the first vehicle.

12. The certificate list update apparatus according to claim 9, wherein the at least one processor is coupled to the at least one memory to execute the instructions to:
determine that the device corresponding to the at least one revoked certificate comprises a network-connected device;
notify a user of the first vehicle to re-register with the network-connected device;
determine that the user has re-registered with the network-connected device; and
send the certificate record to the network-connected device in the first vehicle.

13. The apparatus according to claim 9, wherein the first vehicle group further comprises a second vehicle, the certificate list further comprises a revoked certificate or a valid certificate of a device that belongs to the second vehicle, and the revoked certificate or the valid certificate of the device that belongs to the second vehicle is used by the first vehicle to attempt to authenticate the second vehicle.

14. A certificate list update method, wherein the method comprises:
receiving a certificate record, wherein the certificate record is sent by a network side device to a first vehicle, and the certificate record comprises at least one revoked certificate or at least one valid certificate, wherein the at least one revoked certificate or the at least one valid certificate comprises a vehicle identifier; and
updating, based on the certificate record, a certificate list stored in the first vehicle, wherein the certificate list is used to record a revoked certificate or a valid certificate of a device that belongs to the first vehicle, or used to record a revoked certificate or a valid certificate of a device that belongs to a first vehicle group, wherein the first vehicle group comprises the first vehicle, and wherein the updating, based on the certificate record, a certificate list stored in the first vehicle
obtaining an identifier of a first certificate list data block, wherein the first certificate list data block is a data block corresponding to the certificate list before update; and
generating an updated certificate list data block based on the identifier of the first certificate list data block and the certificate record, wherein the updated certificate list data block comprises a block header and a block body, the block header of the updated certificate list data block comprises a hash value of the first certificate list data block, and the block body of the updated certificate list data block comprises the revoked certificate or the valid certificate that is in the certificate record and that is of the device that belongs to the first vehicle or the first vehicle group.

15. The certificate list update method according to claim 14, wherein each revoked certificate or each valid certificate comprised in the certificate record is a certificate of the device that belongs to the first vehicle or the first vehicle group.

16. The certificate list update method according to claim 15, wherein the updating, based on the certificate record, a certificate list stored in the first vehicle comprises:
adding each revoked certificate or each valid certificate in the certificate record to the certificate list.

17. The certificate list update method according to claim 14, wherein the updating, based on the certificate record, a certificate list stored in the first vehicle comprises:
determining at least one revoked certificate or at least one valid certificate that is in the certificate record and that is of the device that belongs to the first vehicle or the first vehicle group; and
adding the at least one revoked certificate or the at least one valid certificate of the device that belongs to the first vehicle or the first vehicle group to the certificate list.

18. The certificate list update method according to claim 14, wherein the first vehicle group further comprises a second vehicle, the certificate list further comprises a revoked certificate or a valid certificate of a device that belongs to the second vehicle, and the revoked certificate or the valid certificate of the device that belongs to the second vehicle is used by the first vehicle to attempt to authenticate the second vehicle.

19. The certificate list update method according to claim 14, wherein the block header of the updated certificate list data block further comprises an identifier of the certificate record.

20. The certificate list update method according to claim 14, wherein the block body of the updated certificate list data block further comprises the first certificate list data block.

21. The certificate list update method according to claim 14, wherein before the updating, based on the certificate record, a certificate list stored in the first vehicle, the method further comprises:
determining the certificate record is verified successfully based on signature information in the certificate record; and
updating, based on the certificate record, the certificate list stored in the first vehicle.

22. A certificate list update method, wherein the method comprises:
determining at least one revoked certificate or at least one valid certificate of a device that belongs to a first vehicle or a first vehicle group, wherein the first vehicle belongs to the first vehicle group, wherein the determining at least one revoked certificate or at least one valid certificate of a device that belongs to a first vehicle or a first vehicle group comprises:
sending a query from a network device to a vehicle certificate management system, wherein the query requests the at least one revoked certificate or the at least one valid certificate of the device that belongs to the first vehicle or the first vehicle group;
generating a certificate record, wherein the certificate record comprises the at least one revoked certificate or the at least one valid certificate of the device that belongs to the first vehicle or the first vehicle group, wherein the at least one revoked certificate or the at least one valid certificate comprises a vehicle identifier; and
sending the certificate record to the first vehicle.

23. The certificate list update method according to claim 22, wherein the determining at least one revoked certificate or at least one valid certificate of a device that belongs to a first vehicle or a first vehicle group comprises:
determining, based on device identifiers or vehicle identifiers in revoked certificates or valid certificates, the at least one revoked certificate or the at least one valid certificate of the device that belongs to the first vehicle or the first vehicle group.

* * * * *